(12) United States Patent
Chappell et al.

(10) Patent No.: US 11,675,594 B2
(45) Date of Patent: Jun. 13, 2023

(54) SYSTEMS, METHODS, AND APPARATUSES TO CONTROL CPU SPECULATION FOR THE PREVENTION OF SIDE-CHANNEL ATTACKS

(71) Applicant: Intel Corporation, Santa Clara, CA (US)

(72) Inventors: Robert S. Chappell, Portland, OR (US); Jason W. Brandt, Austin, TX (US); Alan Cox, Abertawe (GB); Asit Mallick, Saratoga, CA (US); Joseph Nuzman, Haifa (IL); Arjan Van De Ven, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 16/236,049

(22) Filed: Dec. 28, 2018

(65) Prior Publication Data

US 2019/0324756 A1   Oct. 24, 2019

Related U.S. Application Data

(60) Provisional application No. 62/660,175, filed on Apr. 19, 2018.

(51) Int. Cl.
*G06F 9/30* (2018.01)
*G06F 9/38* (2018.01)
*G06F 21/55* (2013.01)

(52) U.S. Cl.
CPC ........ *G06F 9/3842* (2013.01); *G06F 9/30058* (2013.01); *G06F 9/30145* (2013.01); *G06F 21/556* (2013.01); *G06F 2221/033* (2013.01)

(58) Field of Classification Search
CPC .............. G06F 9/3842; G06F 9/30145; G06F 9/30058; G06F 21/556; G06F 2221/033; G06F 9/30076; G06F 9/30087; G06F 9/3844; G06F 9/3857
See application file for complete search history.

(56) References Cited

U.S. PATENT DOCUMENTS

| 10,394,716 | B1 * | 8/2019 | Piry .................... G06F 9/30058 |
| 2015/0095578 | A1 * | 4/2015 | Doshi ................. G06F 12/0888 711/125 |
| 2019/0205140 | A1 * | 7/2019 | Grisenthwaite ..... G06F 9/30018 |
| 2019/0286443 | A1 * | 9/2019 | Solomatnikov ....... G06F 9/3842 |

* cited by examiner

*Primary Examiner* — Corey S Faherty
(74) *Attorney, Agent, or Firm* — Nicholson De Vos Webster & Elliott, LLP

(57) ABSTRACT

Embodiments of instructions are detailed herein including one or more of 1) a branch fence instruction, prefix, or variants (BFENCE); 2) a predictor fence instruction, prefix, or variants (PFENCE); 3) an exception fence instruction, prefix, or variants (EFENCE); 4) an address computation fence instruction, prefix, or variants (AFENCE); 5) a register fence instruction, prefix, or variants (RFENCE); and, additionally, modes that apply the above semantics to some or all ordinary instructions.

18 Claims, 23 Drawing Sheets

```
┌─────────────────────────────────────────────────────────────────────────┐
│ FETCH AN INSTRUCTION HAVING A FIELD TO INDICATE A BRANCHING FENCE (BFENCE) │
│              OPERATION IS TO OCCUR 101                                   │
└─────────────────────────────────────────────────────────────────────────┘
                                    │
                                    ▼
┌─────────────────────────────────────────────────────────────────────────┐
│    DECODE THE INSTRUCTION HAVING THE FIELD TO INDICATE THE BRANCHING FENCE │
│              (BFENCE) OPERATION IS TO OCCUR 103                          │
└─────────────────────────────────────────────────────────────────────────┘
                                    │
                                    ▼
┌─────────────────────────────────────────────────────────────────────────┐
│                                                                         │
│ EXECUTE THE DECODED INSTRUCTION TO CAUSE A RESOLUTION OF ALL PRECEDING   │
│ BRANCH SPECULATION PRIOR TO ANY SPECULATIVE EXECUTION OF INSTRUCTIONS    │
│      SUBSEQUENT TO THE BFENCE INSTRUCTION 107                            │
│                                                                         │
└─────────────────────────────────────────────────────────────────────────┘
                                    │
                                    ▼
┌─────────────────────────────────────────────────────────────────────────┐
│              COMMIT A RESULT OF THE EXECUTED INSTRUCTION                 │
│                              109                                         │
└─────────────────────────────────────────────────────────────────────────┘
```

*FIG. 1*

| TAG 210 | BLOCK OFFSET 220 | BRANCH TYPE 230 | TRUE HISTORY 240 | SPECULATIVE HISTORY 250 | HISTORY SELECTION BIT 270 | VALID BIT 280 | BRANCH TARGET ADDRESS 290 | BFENCE 260 |
|---|---|---|---|---|---|---|---|---|

FIG. 2

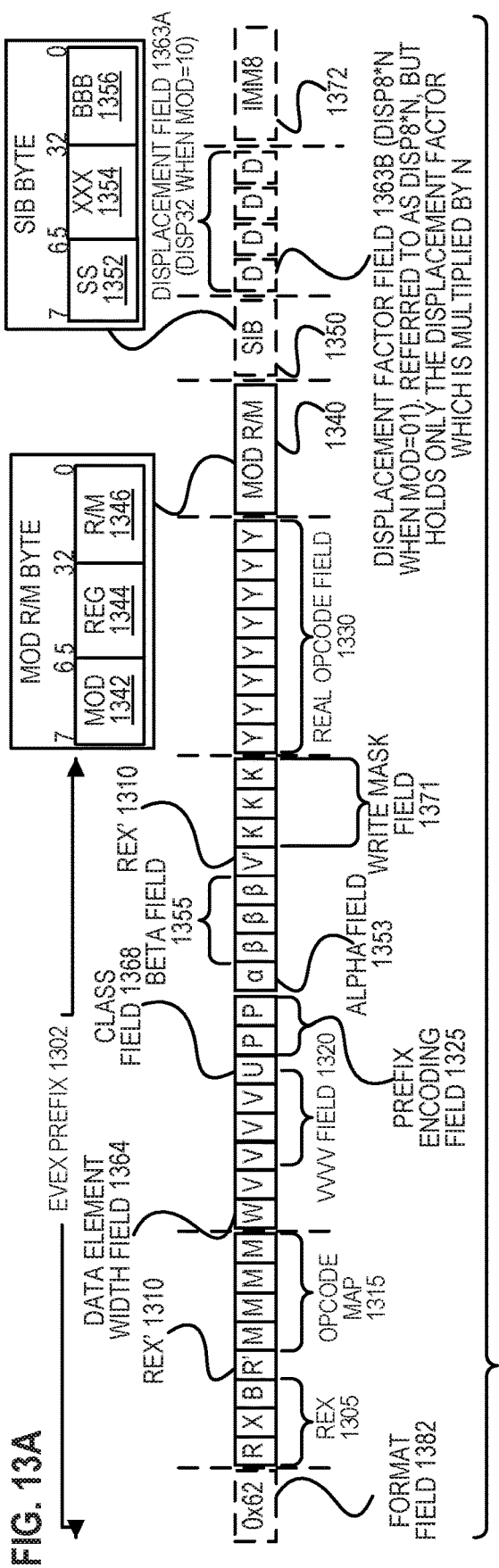
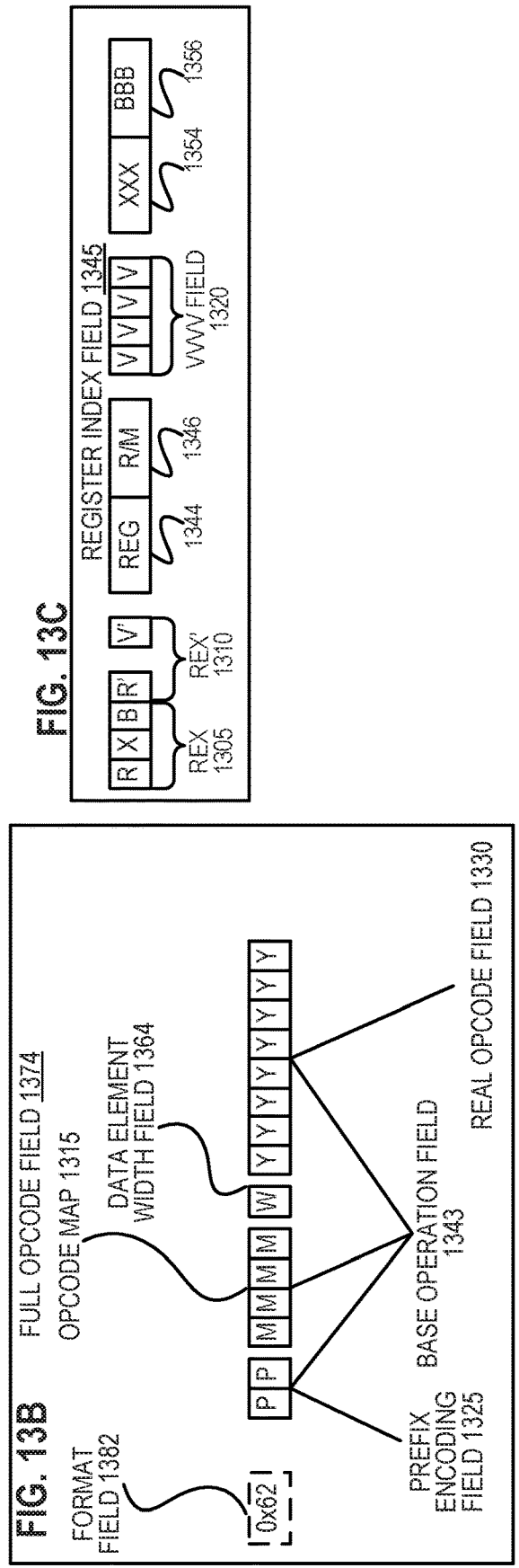

SYSTEMS, METHODS, AND APPARATUSES TO CONTROL CPU SPECULATION FOR THE PREVENTION OF SIDE-CHANNEL ATTACKS

FIELD OF INVENTION

The field of invention relates generally to computer processor architecture, and, more specifically, to fence operations.

BACKGROUND

Side-channel attacks are an emergent and growing threat to safe computing. A side-channel attack against a CPU uses precise measurement of microarchitectural side-effects to infer the values of secret data that otherwise would not be available to an attacker. For example, an attacker can execute code that times the access latency to data caches to gain information about the addresses the victim workload has recently accessed and caused to be cached.

BRIEF DESCRIPTION OF THE DRAWINGS

The present invention is illustrated by way of example and not limitation in the figures of the accompanying drawings, in which like references indicate similar elements.

FIG. 1 illustrates an embodiment of method performed by a processor to process an instruction to perform a BFENCE operation.

FIG. 2 illustrates the branch information stored within each branch entry of the BTB.

FIG. 13A is a block diagram illustrating an exemplary instruction format according to embodiments of the invention.

FIG. 13B is a block diagram illustrating the fields of the instruction format that make up the full opcode field according to one embodiment of the invention.

FIG. 13C is a block diagram illustrating the fields of the instruction format that make up the register index field according to one embodiment of the invention.

DETAILED DESCRIPTION

Figure 3:
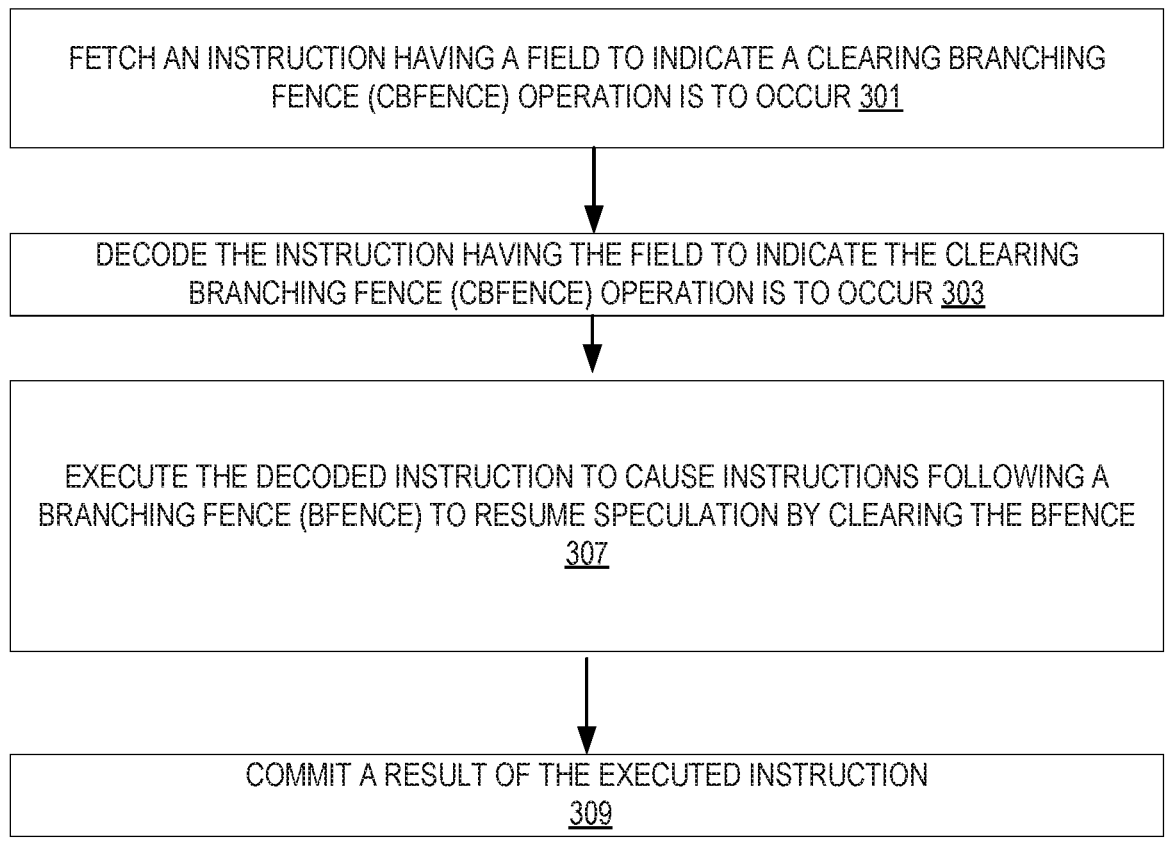
FIG. 3 illustrates an embodiment of method performed by a processor to process an instruction to perform a CBFENCE operation.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An attacker can use speculative execution to create microarchitectural side-effects that more profitably reveal secret information from the victim workload. Modern CPUs utilize many mechanisms that learn and predict future execution to save processing time. For example, CPUs predict the outcomes of conditional branches so that processing can continue in the "shadow" of each branch prior to the calculation of the true outcome. Clever attackers can influence these speculation mechanisms and measure the microarchitectural side-effects created during speculative execution, thereby learning information about the victim even if the victim never architecturally commits the results of the speculative instructions.

Architectural mechanisms exist in many instruction set architectures that can be used to control CPU speculation. These include: 1) serializing instructions prevent younger instructions from executing speculatively until some or all of the results of older instructions are architecturally committed (for example, LFENCE, CPUID); and 2) non-speculative modes or memory types define execution semantics that prevent speculative execution entirely, such as by fetching and executing instructions one-at-a-time (for example, instructions mapped in UC memory type).

Further, architectural mechanisms exist that can be used to disrupt side-channel attack measurement. These include: cache flush instructions evict cached instructions and/or data, preventing measurement by an attacker (for example, WBINVLD). Caches common and are a frequent means by which attackers create and measure a side-channel (e.g., a prime-and-probe).

The mechanisms described above were not intended to combat speculative side-channel attacks. They operate at a coarse granularity and/or have detrimental performance effects that make them unsuitable wide deployment. All these methods—delaying all younger instructions, executing one instruction at a time, or flushing all caches—have a major performance impact on all subsequent instruction execution, regardless of the relevance to handling and protecting secret data.

Embodiments detailed herein include architectural extensions that control different forms of speculation in CPUs, thereby limiting an attacker's ability to profit from information leakage through speculative side-channels. These extensions include one or more of: 1) a branch fence instruction, prefix, or variants (BFENCE); 2) a predictor fence instruction, prefix, or variants (PFENCE); 3) an exception fence instruction, prefix, or variants (EFENCE); 4) an address computation fence instruction, prefix, or variants (AFENCE); 5) a register fence instruction, prefix, or variants (RFENCE); and modes that apply the above semantics to some or all ordinary instructions.

A distinct instruction is a dedicated opcode that is decoded and executed as a single instruction with a register operand. A prefix is a prefix byte or bytes that adds semantics to an existing instruction on some or all operands, ensuring register fencing semantics occur prior to consumption of the affected operands by the prefixed instruction. Variants are alternative encodings of existing instructions or specified operands to existing instructions that add semantics before the existing semantics.

Embodiments of a Branch Fence Instruction, Prefix, or Variants (BFENCE)

In some embodiments, a branch fence (or BFENCE) (instruction/prefix/variant) is a marker in the instruction stream that instructs a CPU to resolve all preceding branch speculation prior to any speculative execution of instructions subsequent to the BFENCE. Using a BFENCE may ensure a code path is executed free of control speculation, protecting against side-effects that may occur from speculative execution of the subsequent instructions. A BFENCE does not guarantee that all older instructions have committed to architectural state, only that branch targets are resolved.

Embodiments of a BFENCE are encoded in an ISA in one or more ways: 1) a distinct instruction—a dedicated opcode that is decoded and executed as a single instruction; 2) a prefix—a prefix byte or bytes that adds BFENCE semantics to an existing instruction, ensuring control speculation as resolved either before or after the instruction preceded by the prefix; and 3) variants—alternative encodings of existing instructions or specified operands to existing instructions that add BFENCE semantics either before or after the existing semantics For simplicity, the discussion below uses distinct BFENCE instructions in its examples. The pseudocode example below shows how a BFENCE can be used to protect against speculative cache side-effects in the shadow of a branch prediction.

```
Function f (pointer) {
    A           If (pointer > 0 AND pointer < 100) {
    // Branch(es) protecting against illegal operands
    B               BFENCE;
    C               Sum += memory[pointer];
    D           }
}
```

The BFENCE in line B ensures that the pointer operand is not dereferenced until the branch instructions of line A have confirmed the value is not illegal before the instructions loading from the pointer address are speculatively executed in line C.

The BFENCE in the above example has better performance characteristics than a serializing instruction, such as LFENCE. In a large out-of-order execution machine, the branch conditions may resolve well before older instructions, allowing the pointer to be dereferenced before being non-speculative and retaining a performance advantage.

In some embodiments, BFENCE (instruction/prefix/variant) is extended. Embodiments of a clear branch fence (CBFENCE) (instruction/prefix/variant) can be used to break the dependence of younger instructions on older BFENCEs. For example, a CBFENCE could be inserted on line D above to allow instructions following the CBFENCE to resume control speculation. Using BFENCE and CBFENCE, software writers can protect vulnerable code from side-channel attacks, while preserving performance.

In some embodiments, BFENCE variations provide finer control over speculation of different branch types (conditional direct branches, indirect branches, calls, etc.). Likewise, embodiments of CBFENCE are subdivided to provide similar semantics for different branch types.

Exemplary Formats of (C)BFENCE Instructions

An embodiment of a format for a BFENCE instruction is BFENCE where BFENCE is the opcode mnemonic of the instruction. In most embodiments, no operands are required.

Another embodiment of a format for a BFENCE instruction is a to utilize a prefix of an instruction (such as prefix 1302) of an existing instruction to indicate that control speculation as resolved either before or after the instruction preceded by the prefix.

Another embodiment is to encode an existing instruction to indicate the use of BFENCE in an instruction in a place other than a prefix.

An embodiment of a format for a CBFENCE instruction is CBFENCE where CBFENCE is the opcode mnemonic of the instruction. In most embodiments, no operands are required.

Another embodiment of a format for a CBFENCE instruction is a to utilize a prefix of an instruction (such as prefix 1302) of an existing instruction to indicate that speculation can resume (the BFENCE is cleared).

Another embodiment is to encode an existing instruction to indicate the use of CBFENCE in an instruction in a place other than a prefix.

Exemplary Method of Execution of the BFENCE Instruction

FIG. 1 illustrates an embodiment of method performed by a processor to process an instruction to perform a BFENCE operation.

At 101, an instruction is fetched. For example, an instruction indicating a BFENCE operation is fetched. The instruction includes a field for an opcode. As noted above, the instruction may indicate a BFENCE in many different forms including a unique opcode to indicate a BFENCE, the use of a prefix on an existing instruction, or the use of some other field of an existing instruction. The indication of the BFENCE specifies that all preceding branch speculation is to be resolved prior to any speculative execution of instructions subsequent to the BFENCE. Depending upon the embodiment, the BFENCE instruction is performed by one or more of a branch prediction unit, instruction fetch unit, decode unit, rename/allocator unit, scheduler unit, memory access unit, retirement unit, or execution unit of a processor such as an address generation unit. Note execution units may include integer, vector, and memory units. Additionally, a "unit" is circuitry.

The fetched instruction is decoded at 103. For example, the fetched BFENCE instruction is decoded by decode circuitry such as that detailed herein.

At 107, the decoded instruction is executed to resolve all preceding branch speculation prior to any speculative execution of instructions subsequent to the BFENCE. The execution may be performed by one or more units as detailed above.

Further in some embodiments, an indication of which branches to resolve is made. For example, each branch that is to be resolved is marked and so long as a marker exists, execution circuitry to not speculatively execution. This halt may come in the form of holding instructions in the scheduling circuitry. In some embodiments, the branch prediction unit (such as 1532) uses includes a branch target buffer (BTB) which stores branch information which may include this marker. FIG. 2 illustrates the branch information stored within each branch entry of the BTB. As illustrated in FIG. 2, each branch entry contains a tag field 210, a block offset field 220, a branch type field 220, a true history field 240, a speculative history field 250, a history selection bit 270, a valid bit 280, and a branch target address field 290. The tag address 210 and the block offset 220 are used to identify a memory address of the branch instruction associated with the branch entry. The branch type field 230 specifies what type of branch instruction the branch entry identifies (e.g., conditional branch, return from subroutine, call subroutine, unconditional branch). The true history field 240 maintains the actual (fully-resolved) taken or not-taken history of the branch instruction for a predetermined number of prior executions. The speculative history field 250 maintains the "speculative" taken or not-taken history of the branch instruction for the predetermined number of prior executions. The history selection bit 270 indicates which of the true history field 240 or the speculative history field will be used to index into a pattern state table when calculating a branch prediction. The valid bit 280 indicates whether or not the branch entry contains valid branch information. The valid bit 280 is typically set during the execute or retirement stage when the branch prediction circuit allocates and fills the corresponding branch entry. The valid bit 280 is cleared when the branch entry is subsequently deallocated by the branch prediction circuit. In some embodiments, the valid bit 280 is used to indicate when a branch has been resolved and BFENCE field 260 indicates the branch instruction is to be resolved prior to resuming speculative execution.

In some embodiments, the instruction is committed or retired at 109.

Exemplary Method of Execution of the CBFENCE Instruction

FIG. 3 illustrates an embodiment of method performed by a processor to process an instruction to perform a CBFENCE operation.

At 301, an instruction is fetched. For example, an instruction indicating a CBFENCE operation is fetched. The instruction includes a field for an opcode. As noted above, the instruction may indicate a CBFENCE in many different forms including a unique opcode to indicate a CBFENCE, the use of a prefix on an existing instruction, or the use of some other field of an existing instruction. The indication of the CBFENCE specifies that a previous BFENCE is canceled and that instructions following the instruction indicating a CBFENCE can result speculation. Depending upon the embodiment, the CBFENCE instruction is performed by one or more of a branch prediction unit, instruction fetch unit, decode unit, rename/allocator unit, scheduler unit, memory access unit, retirement unit, or execution unit of a processor such as an address generation unit. Note execution units may include integer, vector, and memory units. Additionally, a "unit" is circuitry.

The fetched instruction is decoded at 303. For example, the fetched CBFENCE instruction is decoded by decode circuitry such as that detailed herein.

At 307, the decoded instruction is executed to resolve all preceding branch speculation prior to any speculative execution of instructions subsequent to the CBFENCE. The execution may be performed by one or more units as detailed above. Further in some embodiments, any markers of branches that were to be resolved are cleared such as clearing field 260. This resumption may come in the form of releasing instructions in the scheduling circuitry.

In some embodiments, the instruction is committed or retired at 309.

Predictor Fence Instruction, Prefix, or Variants (PFENCE)

A predictor fence (or PFENCE) (instruction/prefix/variant) is a marker in the instruction stream that instructs the CPU to discard all prediction context established by older instructions (instructions before PFENCE) and, in some embodiments, replace the prediction context with a context specified by an operand. By placing a PFENCE, attackers cannot influence speculation within a region of code by training predictors (branch predictors, prefetchers, memory dependence predictors, etc.) with dummy code of their own design. In some embodiments, an operand provides a means to reuse predictor context from the same region of code, thereby preserving performance.

Like BFENCE, a PFENCE may be encoded in an ISA as a distinct instruction, a prefix on existing instructions, or as a variant of an existing instruction depending on the embodiment. For simplicity, PFENCE as a distinct instruction is used in the examples.

The pseudocode below shows how a PFENCE (line A) can be used to protect against manipulation of prediction state to influence speculation of bounds checking branches (line B) and prefetcher operation (line C).

```
       Function f (pointer) {
A          PFENCE;
B          If (pointer > 0 AND pointer < 100) { // Branch(es) protecting
against illegal operands
C              Sum += memory[pointer];
D          }
       }
```

In some embodiments, PFENCE includes an operand which specifies which predictor context to install after discarding the current context. This enables a programmer to create regions of code that are isolated from predictor training in other regions without losing the benefit of speculation. In some embodiments, the instruction pointer of the PFENCE instruction is used as the operand.

In some embodiments, PFENCE includes variants that apply to particular types of predictors (e.g. types of branches, values, memory address, etc.).

In some embodiments, a clear predictor fence (CPFENCE) (instruction/prefix/variant) instructs the CPU to discard the current predictor context and return to the default predictor context. If the PFENCE at line A contains an operand to specify predictor context, a CPFENCE inserted at line D in the example would return to the default context. Note a default context could also be implemented by an operand value (e.g. PFENCE 0).

Exemplary Formats of a (C)PFENCE Instruction

An embodiment of a format for a PFENCE instruction is PFENCE where PFENCE is the opcode mnemonic of the instruction. In some embodiments, a source field indicates a location of a prediction context to replace the existing context. The source may be memory or registers depending on the embodiment. Further, in some embodiments, one or more fields of the instruction indicate where to store the existing context.

Another embodiment of a format for a PFENCE instruction is a to utilize a prefix of an instruction (such as prefix 1302) of an existing instruction to indicate the use of PFENCE.

Another embodiment is to encode an existing instruction to indicate the use of PFENCE in an instruction in a place other than a prefix.

An embodiment of a format for a CPFENCE instruction is CPFENCE where CPFENCE is the opcode mnemonic of the instruction. In some embodiments, a source field indicates a location of a prediction context to replace the existing context. The source may be memory or registers depending on the embodiment. Further, in some embodiments, one or more fields of the instruction indicate where to store the existing context.

Another embodiment of a format for a CPFENCE instruction is a to utilize a prefix of an instruction (such as prefix 1302) of an existing instruction to indicate the clearing of a PFENCE.

Another embodiment is to encode an existing instruction to indicate the use of CPFENCE in an instruction in a place other than a prefix.

Exemplary Method of Execution of a PFENCE Instruction

Figure 4:
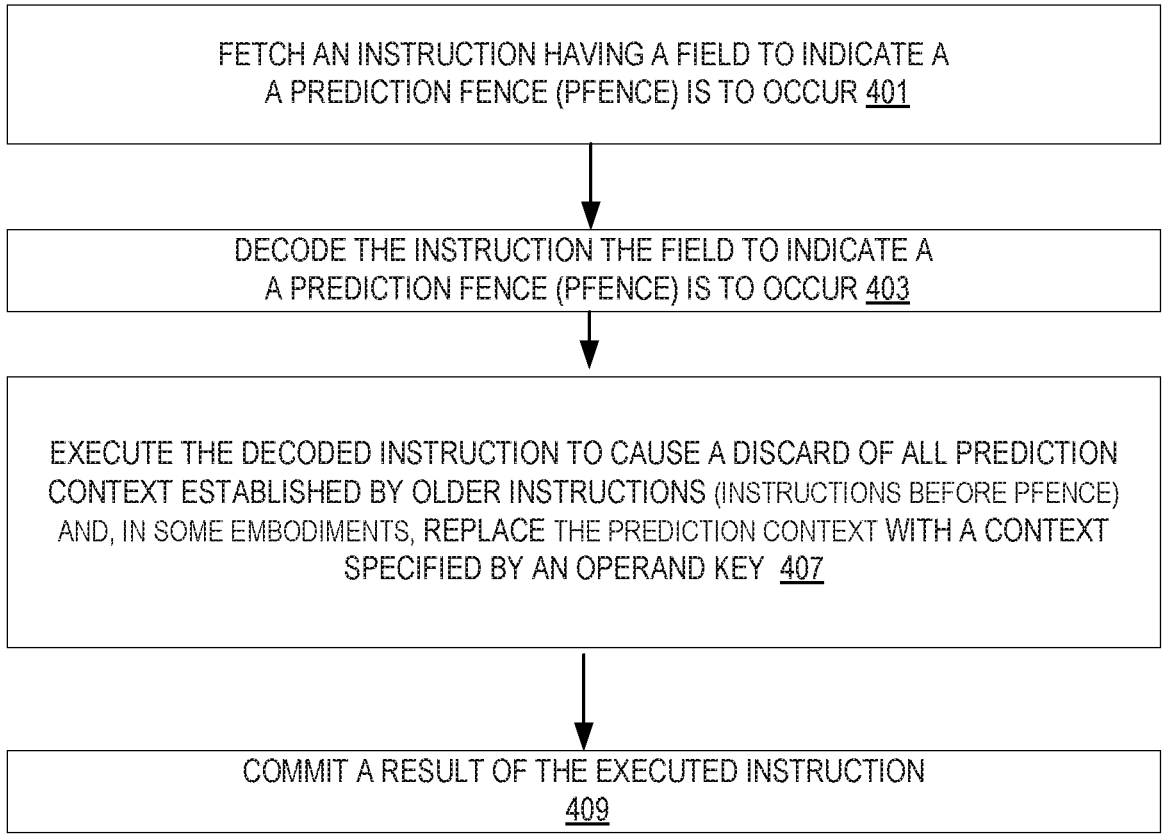
FIG. 4 illustrates an embodiment of method performed by a processor to process an instruction indicating a PFENCE operation.

FIG. 4 illustrates an embodiment of method performed by a processor to process an instruction indicating a PFENCE operation.

At 401, an instruction is fetched. For example, an instruction is fetched. The instruction includes a field for an opcode. As noted above, the instruction may indicate a PFENCE in many different forms including a unique opcode to indicate a PFENCE, the use of a prefix on an existing instruction, or the use of some other field of an existing instruction. The indication of a PFENCE specifies to discard all prediction context established by older instructions (instructions before PFENCE) and, in some embodiments, the prediction context is replaced with a context specified by an operand. In some embodiments, the PFENCE includes a field to indicate a location of a prediction context to replace existing context. In some embodiments, the prediction context of one or more of branch predictors of branch prediction unit 1532, prefetch predictors of fetch unit 1538 and memory dependence predictors of memory access circuitry 1564 are discarded. Further, in some embodiments, one or more fields of the instruction indicate where to store the context to be replaced Depending upon the embodiment, the PFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B.

The fetched instruction is decoded at 403. For example, the fetched PFENCE instruction is decoded by decode circuitry such as that detailed herein.

At 407, the decoded instruction is executed to discard all prediction context established by older instructions (instructions before PFENCE) and, in some embodiments, the prediction context is replaced with a context specified by an operand. Further, in some embodiments, one or more fields of the instruction indicate where to store the context to be replaced and the replaced context is stored at that location or locations. The execution may be performed by one or more units as detailed above. In some embodiments, the prediction context of one or more of branch predictors of branch prediction unit 1532, prefetch predictors of fetch unit 1538, and memory dependence predictors of memory access circuitry 1564 are discarded.

In some embodiments, the instruction is committed or retired at 409.

Exemplary Method of Execution of the CPFENCE Instruction

Figure 5:
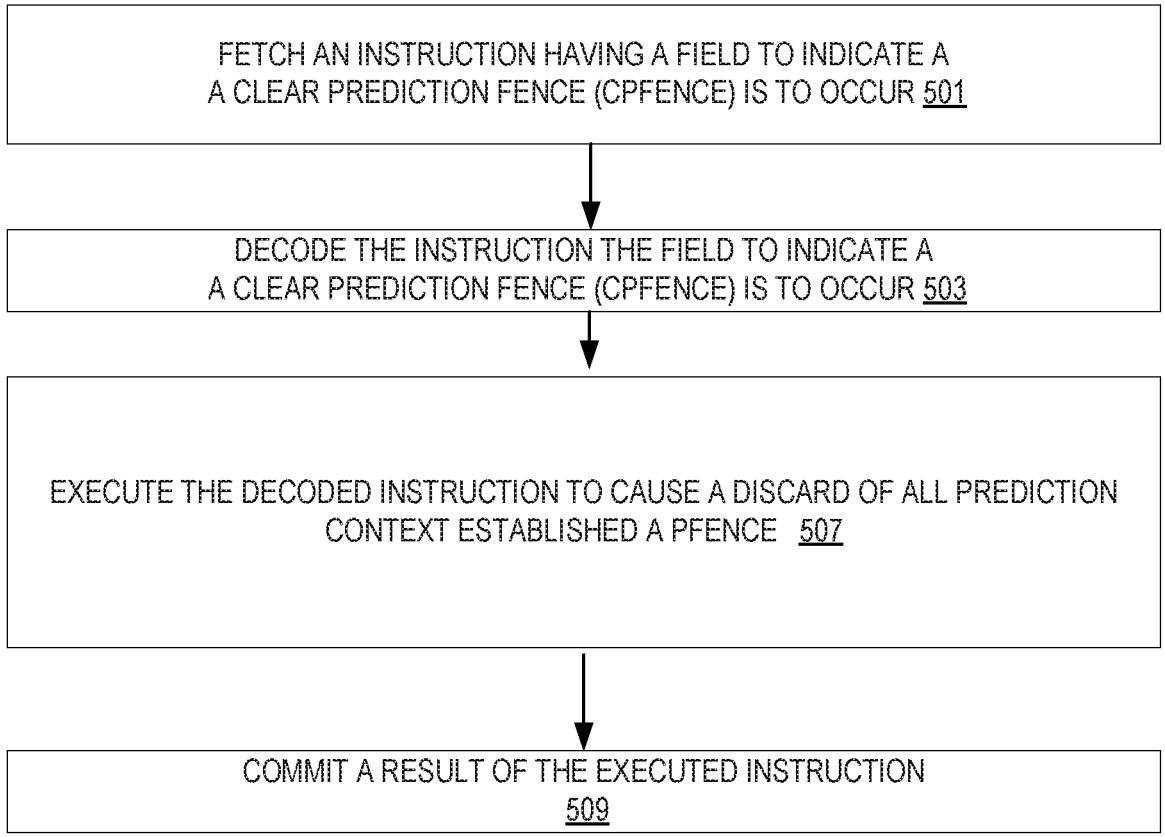
FIG. 5 illustrates an embodiment of method performed by a processor to process an instruction indicating a CPFENCE.

FIG. 5 illustrates an embodiment of method performed by a processor to process an instruction indicating a CPFENCE.

At 501, an instruction is fetched. For example, an instruction is fetched. The instruction includes a field for an opcode. As noted above, the instruction may indicate a CPFENCE in many different forms including a unique opcode to indicate a CPFENCE, the use of a prefix on an existing instruction, or the use of some other field of an existing instruction. The indication of a CPFENCE specifies to discard the current prediction context replace it with the original context. In some embodiments, the CPFENCE includes a field to indicate a location of a prediction context to replace existing context. In some embodiments, the prediction context of one or more of branch predictors of branch prediction unit 1532, prefetch predictors of fetch unit 1538, and memory dependence predictors of memory access circuitry 1564 are replaced. Depending upon the embodiment, the CPFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B.

The fetched instruction is decoded at 503. For example, the fetched CPFENCE instruction is decoded by decode circuitry such as that detailed herein.

At 507, the decoded instruction is executed to replace prediction contexts established by a PFENCE with context specified operands of the instruction. The execution may be performed by one or more units as detailed above. In some embodiments, the prediction context of one or more of branch predictors of branch prediction unit 1532, prefetch predictors of fetch unit 1538, and memory dependence predictors of memory access circuitry 1564 are replaced.

In some embodiments, the instruction is committed or retired at 509.

Exception Fence Instruction, Prefix, or Variants (EFENCE)

An exception fence (or EFENCE) (instruction/prefix/variant) is a marker in the instruction stream that instructs the CPU to resolve all potential exceptions (such as faults including general protection, segment, alignment check, and page faults; system exceptions such as invalid opcodes; floating-point errors such as divide by zero, etc.) before speculatively executing instructions past the EFENCE. By placing an EFENCE, one may ensure a code path is not executed past faults and other exceptions. The EFENCE does not prevent all speculation; it ensures that potential faults/exceptions are calculated prior to speculative execution of younger instructions. Note that interrupts are not considered exceptions.

Like BFENCE, an EFENCE may be encoded in the ISA as a distinct instruction, a prefix on existing instructions, or as a variant of an existing instruction depending upon the embodiment. For simplicity, EFENCE as a distinct instruction is used in the examples.

The pseudocode example below shows how an EFENCE (line C) can be used to protect against speculation past page faults generated by line B (and earlier instructions) before any speculative execution related to line D.

```
        Function f (pointer) {
    A       If (pointer > 0 AND pointer < 100) { // Branch(es) protecting
against illegal operands
    B           temp = memory[pointer];
    C           EFENCE;
    D           memory[temp]++;
    E       }
        }
```

In some embodiments, a clear exception fence (CEFENCE) (instruction/prefix/variant) can be used to break the dependence of younger instructions on older EFENCEs. For example, a CEFENCE could be inserted on line E above to allow instructions following the CEFENCE to resume control speculation. Using EFENCE and CEFENCE, software writers can protect vulnerable code from side-channel attacks, while preserving performance.

Exemplary Formats of a (C)EFENCE Instruction

An embodiment of a format for an EFENCE instruction is EFENCE where EFENCE is the opcode mnemonic of the instruction.

Another embodiment of a format for an EFENCE instruction is a to utilize a prefix of an instruction (such as prefix 1302) of an existing instruction to indicate that control speculation as resolved either before or after the instruction preceded by the prefix.

Another embodiment is to encode an existing instruction to indicate the use of BFENCE in an instruction in a place other than a prefix.

An embodiment of a format for a CEFENCE instruction is CEFENCE where CEFENCE is the opcode mnemonic of the instruction. In most embodiments, no operands are required.

Another embodiment of a format for a CEFENCE instruction is a to utilize a prefix of an instruction (such as prefix 1302) of an existing instruction to indicate that speculation can resume (the EFENCE is cleared).

Another embodiment is to encode an existing instruction to indicate the use of CEFENCE in an instruction in a place other than a prefix.

Exemplary Method of Execution of the EFENCE Instruction

Figure 6:
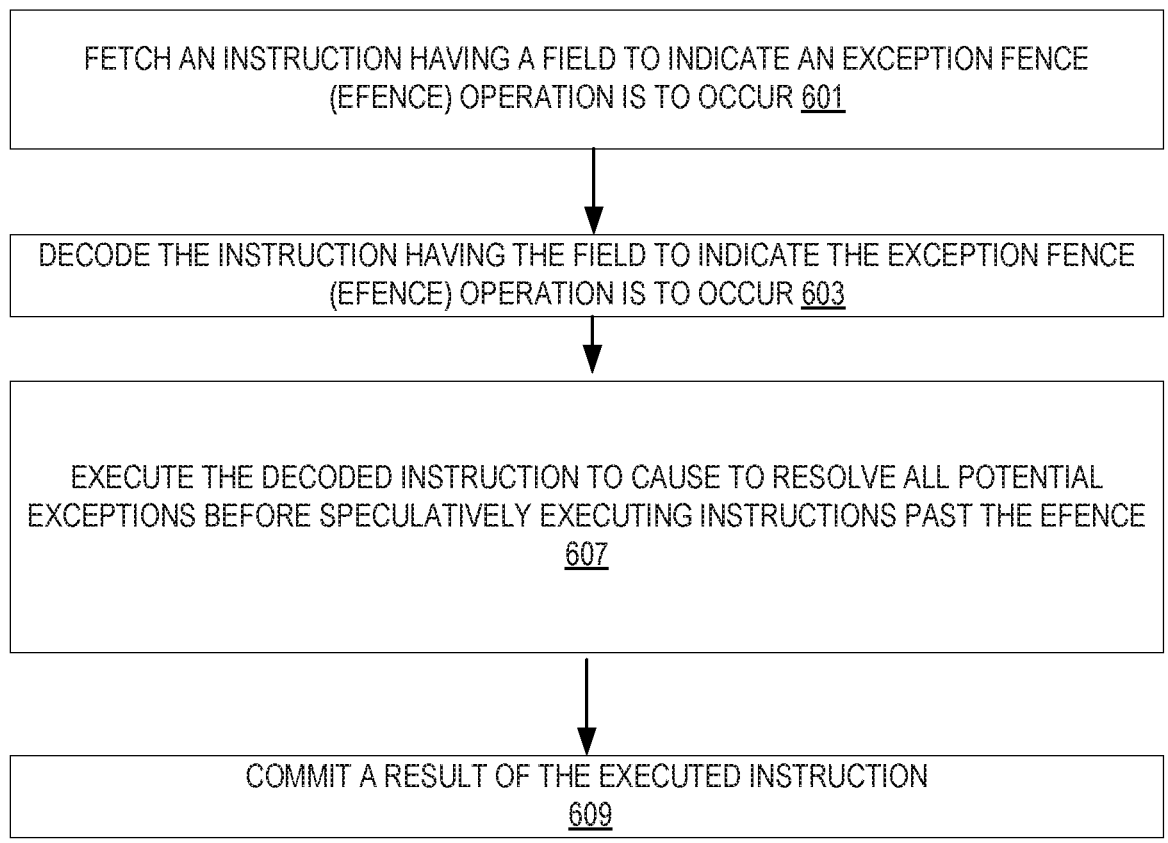
FIG. 6 illustrates an embodiment of method performed by a processor to process an EFENCE indicating instruction.

FIG. 6 illustrates an embodiment of method performed by a processor to process an EFENCE indicating instruction.

At 601, an instruction is fetched. For example, an instruction indicating an EFENCE operation is fetched. The instruction includes a field for an opcode. As noted above, the instruction may indicate an EFENCE in many different forms including a unique opcode to indicate an EFENCE, the use of a prefix on an existing instruction, or the use of some other field of an existing instruction. The indication of EFENCE specifies that all potential exceptions are to be resolved before speculatively executing instructions past the EFENCE. Depending upon the embodiment, the EFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B. For example, the decode circuitry 1540 may throw an exception of an illegal opcode, the memory access circuitry 1564 may throw an exception indicating a page fault, etc., or the execution unites 1562 may throw an exception for errors such as divide by zero. Each of exception is to be resolved (for example by an exception handler) prior to either the scheduler 1556 scheduling subsequent speculatively executed instruction and/or the execution cluster 1560 is to execute such instructions. In some embodiments, tracking of progress of the EFENCE is provided by the scheduler 1556 (or other unit). In some embodiments, one or more fields of one or more registers are written to when an exception handler is in operation and those fields are cleared when the exception handlers are done. These registers therefore serve as trackers.

The fetched instruction is decoded at 603. For example, the fetched EFENCE instruction is decoded by decode circuitry such as that detailed herein.

At 607, the decoded instruction is executed to resolve all potential exceptions before speculatively executing instructions past the EFENCE. The execution may be performed by one or more units as detailed above.

In some embodiments, the instruction is committed or retired at 609.

Exemplary Method of Execution of the EFENCE Instruction

Figure 7:
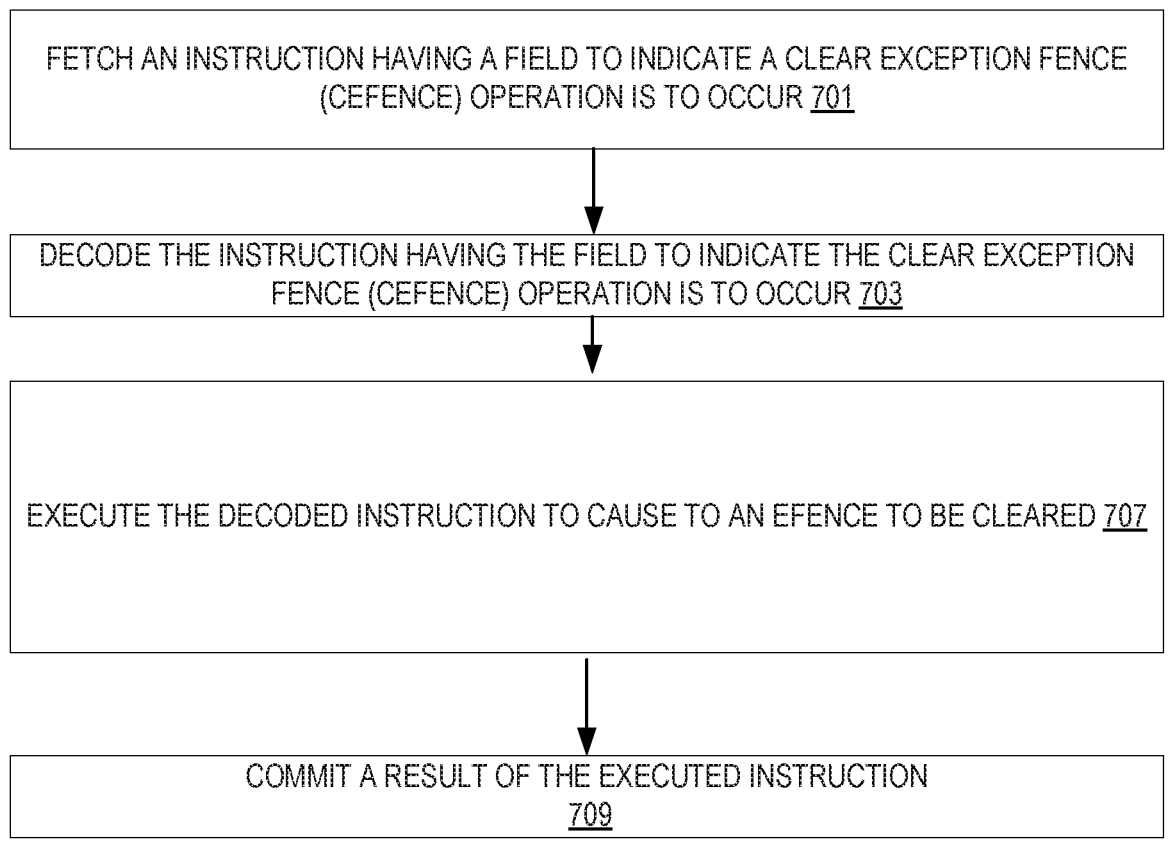
FIG. 7 illustrates an embodiment of method performed by a processor to process an CEFENCE indicating instruction.

FIG. 7 illustrates an embodiment of method performed by a processor to process an CEFENCE indicating instruction.

At 701, an instruction is fetched. For example, an instruction indicating a CEFENCE operation is fetched. The instruction includes a field for an opcode. As noted above, the instruction may indicate an CEFENCE in many different forms including a unique opcode to indicate an CEFENCE, the use of a prefix on an existing instruction, or the use of some other field of an existing instruction. The indication of CEFENCE specifies that a previous EFENCE is to be lifted regardless of any outstanding exceptions. Depending upon the embodiment, the CEFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B. For example, the scheduler 1556 is to schedule subsequent speculatively executed instruction and/or the execution cluster 1560 is to execute such instructions.

The fetched instruction is decoded at 703. For example, the fetched CEFENCE instruction is decoded by decode circuitry such as that detailed herein.

At 707, the decoded instruction is executed to clear a previous EFENCE. The execution may be performed by one or more units as detailed above.

In some embodiments, the instruction is committed or retired at 709.

Address Fence Instruction, Prefix, or Variants (AFENCE)

An address fence (or AFENCE) is a marker in the instruction stream that instructs the CPU to compute all addresses of memory references older than the AFENCE prior to speculative execution of instructions younger than the AFENCE. By placing an AFENCE, the programmer can ensure that an attacker cannot exploit address prediction mechanisms or out-of-order address computation and speculation to influence dependent behavior.

Like BFENCE, an AFENCE is encoded in the ISA as a distinct instruction, a prefix on existing instructions, or as a variant of an existing instruction depending upon the embodiment. For simplicity, PFENCE as a distinct instruction is used in the examples.

The pseudocode example below shows how an AFENCE (line A) can be used to protect against speculative manipulation a variable stored in memory (line B) involved in untrusted pointer checking (line C). The value of bound would be speculatively loaded from memory or a matching store address free of older address speculation on stores, including speculation of unknown store addresses. The AFENCE does not prevent other forms of speculation (such as control speculation from branch prediction); it ensures that address speculation and data speculation affecting addresses have been resolved prior to execution of younger instructions.

```
Function f (pointer) {
A    AFENCE;
B    bound = memory[bound address];
C    If (pointer > 0 AND pointer < bound) { // Branch(es) protecting against illegal operands
D        Sum += memory[pointer];
E    }
}
```

In some embodiments, a clear address fence (CAFENCE) instruction/prefix/variant can be used to break the dependence of younger instructions on older AFENCEs. For example, a CAFENCE could be inserted on line E above to allow instructions following the CAFENCE to benefit from address speculation on instructions older than the AFENCE. Using AFENCE and CAFENCE, software writers can protect vulnerable code from side-channel attacks, while preserving performance.

Exemplary Formats of a (C)AFENCE Instruction

An embodiment of a format for an AFENCE instruction is AFENCE where AFENCE is the opcode mnemonic of the instruction.

Another embodiment of a format for an AFENCE instruction is a to utilize a prefix of an instruction (such as prefix 1302) of an existing instruction to indicate that control speculation as resolved either before or after the instruction preceded by the prefix.

Another embodiment is to encode an existing instruction to indicate the use of BFENCE in an instruction in a place other than a prefix.

An embodiment of a format for a CAFENCE instruction is CAFENCE where CAFENCE is the opcode mnemonic of the instruction. In most embodiments, no operands are required.

Another embodiment of a format for a CAFENCE instruction is a to utilize a prefix of an instruction (such as prefix 1302) of an existing instruction to indicate that speculation can resume (the AFENCE is cleared.

Another embodiment is to encode an existing instruction to indicate the use of CAFENCE in an instruction in a place other than a prefix.

Exemplary Method of Execution of the AFENCE Instruction

Figure 8:
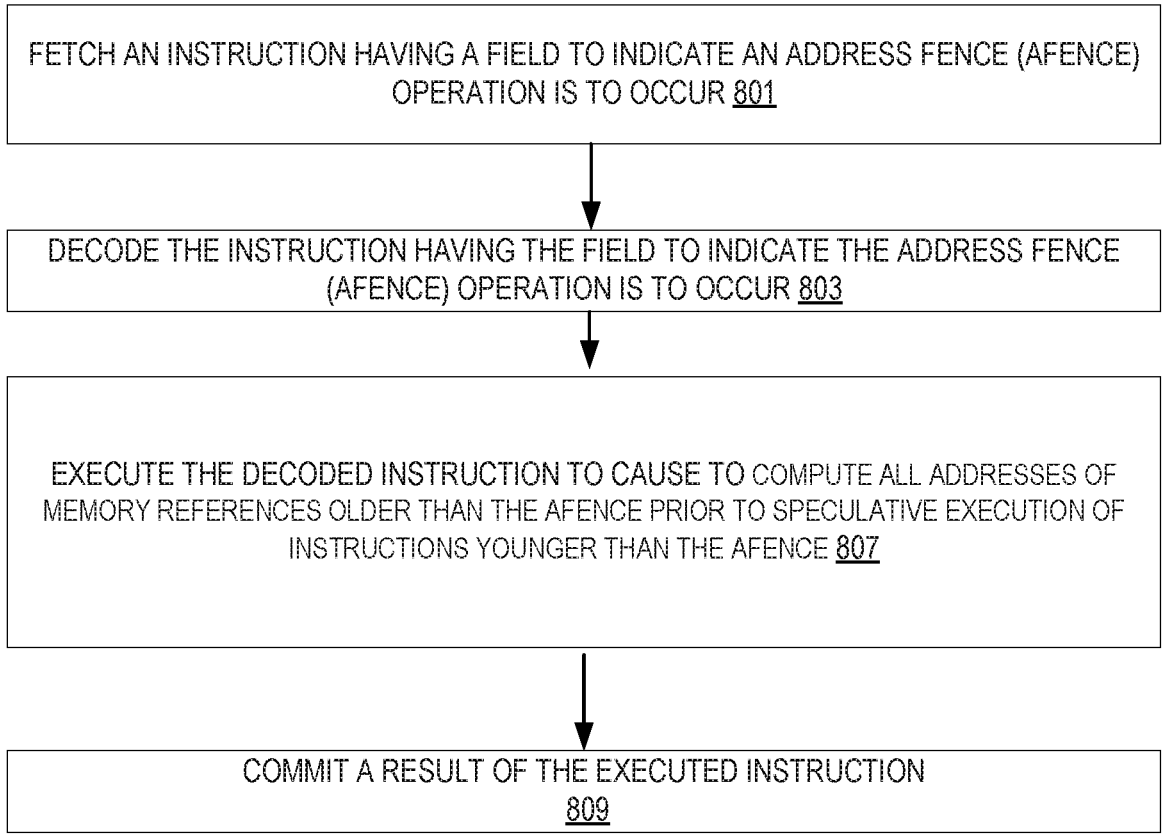
FIG. 8 illustrates an embodiment of method performed by a processor to process an AFENCE indicating instruction.

FIG. 8 illustrates an embodiment of method performed by a processor to process an AFENCE indicating instruction.

At 801, an instruction is fetched. For example, an instruction indicating an AFENCE operation is fetched. The instruction includes a field for an opcode. As noted above, the instruction may indicate an AFENCE in many different forms including a unique opcode to indicate an AFENCE, the use of a prefix on an existing instruction, or the use of some other field of an existing instruction. The indication of AFENCE specifies that all addresses of memory references older than the AFENCE prior to speculative execution of instructions younger than the AFENCE. Depending upon the embodiment, the AFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B. In most embodiments, an address generation unit (AGU) of the memory access unit performs the address calculation.

In some embodiments, the scheduler 1556 halts scheduling subsequent speculatively executed instruction and/or the execution cluster 1560 is to stop executing such instructions while the AFENCE is in place. In some embodiments, tracking of progress of the AFENCE is provided by the scheduler 1556 (or other unit).

The fetched instruction is decoded at 803. For example, the fetched AFENCE instruction is decoded by decode circuitry such as that detailed herein.

At 807, the decoded instruction is executed to compute all addresses of memory references older than the AFENCE prior to speculative execution of instructions younger than the AFENCE. The execution may be performed by one or more units as detailed above.

In some embodiments, the instruction is committed or retired at 809.

Exemplary Method of Execution of the CAFENCE Instruction

Figure 9:
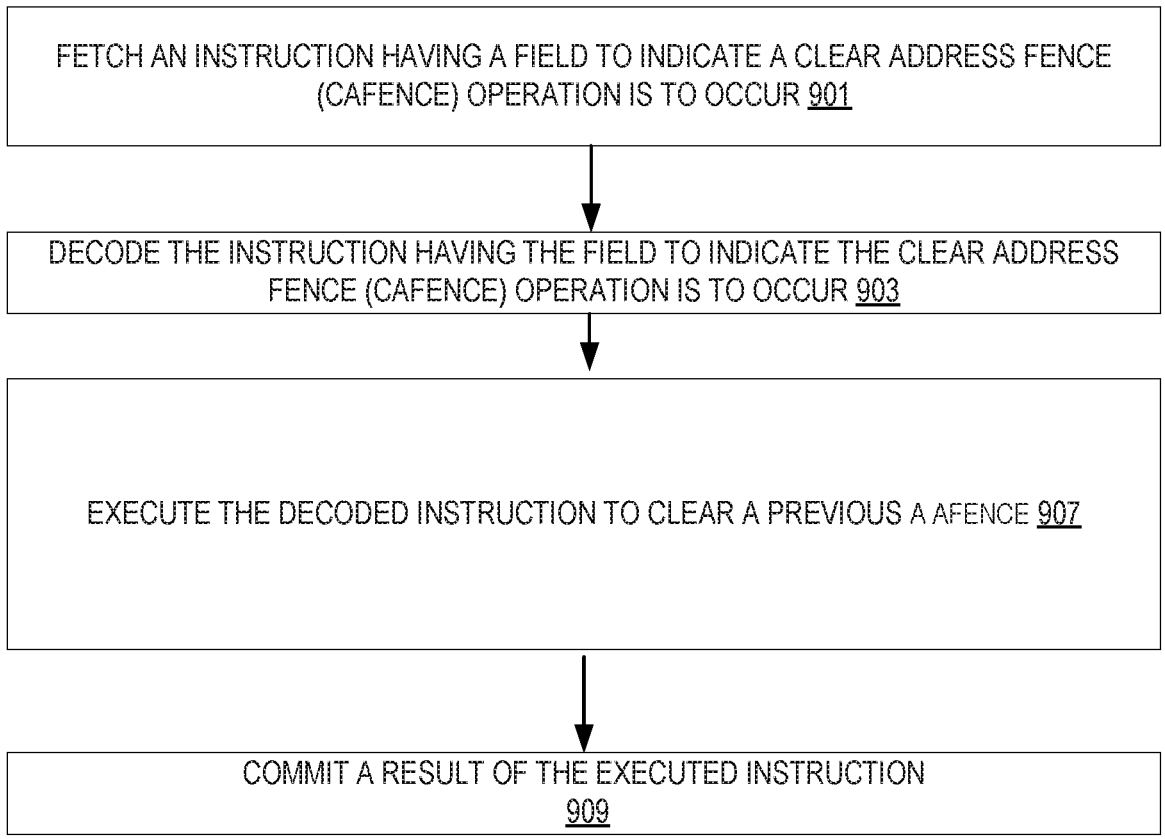
FIG. 9 illustrates an embodiment of method performed by a processor to process an CAFENCE indicating instruction.

FIG. 9 illustrates an embodiment of method performed by a processor to process an CAFENCE indicating instruction.

At 901, an instruction is fetched. For example, an instruction indicating a CAFENCE operation is fetched. The instruction includes a field for an opcode. As noted above, the instruction may indicate an CAFENCE in many different forms including a unique opcode to indicate a CAFENCE, the use of a prefix on an existing instruction, or the use of some other field of an existing instruction. The indication of CAFENCE specifies that a previous AFENCE is to be cleared and speculative execution resumed. Depending upon the embodiment, the AFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B. In most embodiments, an address generation unit (AGU) of the memory access unit performs the address calculation.

In some embodiments, the scheduler 1556 halts scheduling subsequent speculatively executed instruction and/or the execution cluster 1560 is to stop executing such instructions while the AFENCE is in place. In some embodiments, tracking of progress of the AFENCE is provided by the scheduler 1556 (or other unit).

The fetched instruction is decoded at 903. For example, the fetched AFENCE instruction is decoded by decode circuitry such as that detailed herein.

At 907, the decoded instruction is executed to clear a previous AFENCE and resume speculative execution of instructions. The execution may be performed by one or more units as detailed above.

In some embodiments, the instruction is committed or retired at 909.

Register Fence Instruction, Prefix, or Variants (RFENCE)

A register fence (or RFENCE) is a marker in the instruction stream that instructs the CPU to resolve all control and data speculation (in some embodiments, data speculation only) prior to speculative execution of the next instruction after the RFENCE that uses the register operand. By placing an RFENCE, it can be ensured that an untrusted operand is free of speculation that might cause an unintended side-effect.

An RFENCE does not guarantee that the operand's producer instruction has committed to architectural state, since exceptions or interrupts may cause it to be discarded.

An RFENCE is encoded in the ISA in one or more ways such as instruction, prefix, or variant depending on the embodiment.

For simplicity, this disclosure uses a distinct RFENCE instruction as an example.

The pseudocode example shows how an RFENCE can be used to protect against speculative cache side-effects in the shadow of a branch prediction.

```
Function f (pointer) {
A       If (pointer > 0 AND pointer < 100) {
// Branch(es) protecting against illegal operands
B              RFENCE <register containing pointer>;
C              Sum += memory[pointer];
D       }
}
```

The RFENCE in line B ensures that instruction in line C consumes the value of pointer free of control speculation (for example, from line A) and any data speculation mechanisms that may predict the value of pointer up to (and including) the dereferencing load in line C.

The RFENCE in the above example has much better performance characteristics than a serializing instruction, such as LFENCE, and provides data speculation protections that do not overtly exist.

In a large out-of-order execution machine, branch conditions and data speculation mechanisms affecting registers may resolve well before all older instructions, allowing the pointer to be de-referenced before being non-speculative and retaining a performance advantage.

In some embodiments, RFENCE variations resolve data speculation only. Together with careful programming, this variant form of RFENCE can protect against side-effects without waiting for all older branches to resolve. See example usage of VRFENCE in line C below, which uses a CMOV data dependency on EFLAGS (line B) to remove the need to resolve the control speculation (line A).

```
Function f (pointer) {
A       If (pointer > 0 AND pointer < 100) {
// Branch(es) protecting against illegal operands
B              clean_pointer = (pointer > 0 AND pointer < 100) ? pointer : 0x0;
// CMOV
C       VRFENCE <register containing clean_pointer;
D       Sum += memory[clean_pointer];
}
}
```

Exemplary Formats of a (C)RFENCE Instruction

An embodiment of a format for an RFENCE instruction is RFENCE REG where RFENCE is the opcode mnemonic of the instruction and REG is a field to indicate a register.

Another embodiment of a format for an RFENCE instruction is a to utilize a prefix of an instruction (such as prefix 1302) of an existing instruction to indicate that control speculation as resolved either before or after the instruction preceded by the prefix.

Another embodiment is to encode an existing instruction to indicate the use of BFENCE in an instruction in a place other than a prefix.

An embodiment of a format for a CRFENCE instruction is CRFENCE where CRFENCE is the opcode mnemonic of the instruction. In most embodiments, no operands are required.

Another embodiment of a format for a CRFENCE instruction is a to utilize a prefix of an instruction (such as prefix 1302) of an existing instruction to indicate that speculation can resume (the RFENCE is cleared).

Another embodiment is to encode an existing instruction to indicate the use of CRFENCE in an instruction in a place other than a prefix.

Exemplary Method of Execution of the RFENCE Instruction

Figure 10:
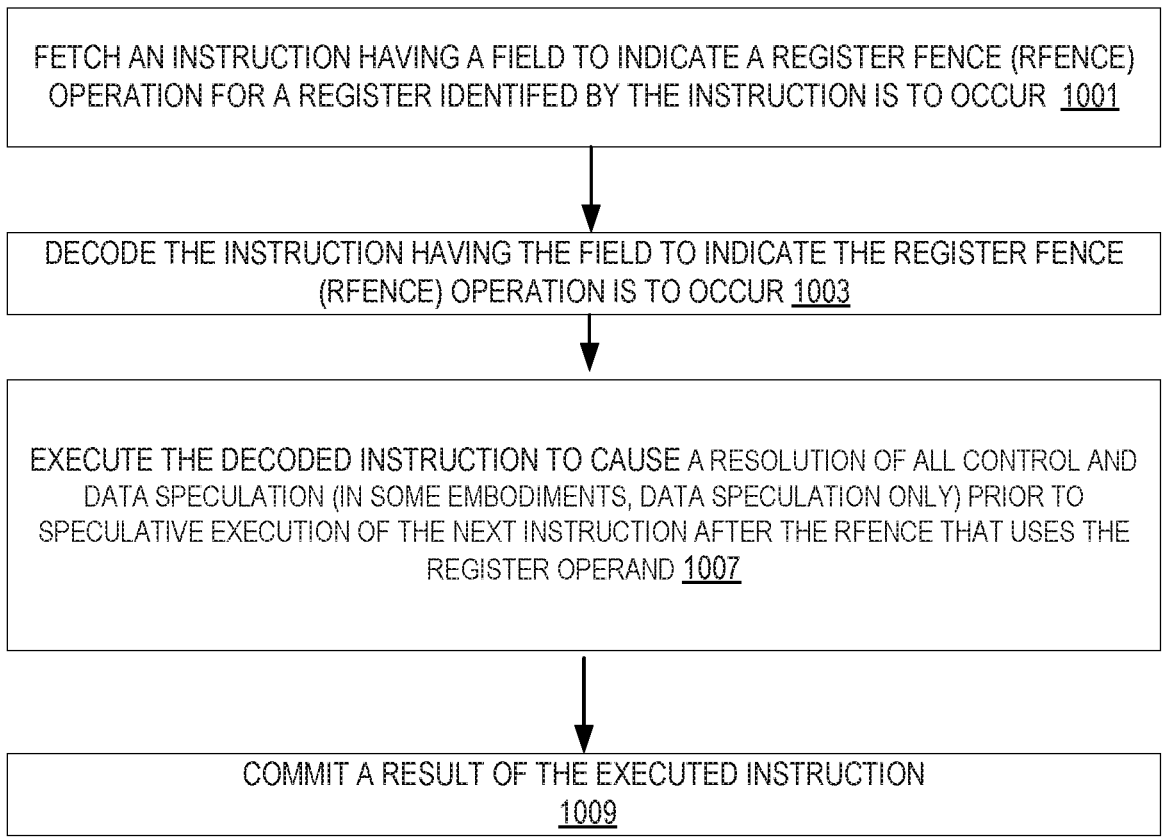
FIG. 10 illustrates an embodiment of method performed by a processor to process a RFENCE indicating instruction.

FIG. 10 illustrates an embodiment of method performed by a processor to process a RFENCE indicating instruction.

At 1001, an instruction is fetched. For example, an instruction indicating a RFENCE operation is fetched. The instruction includes a field for an opcode. As noted above, the instruction may indicate an RFENCE in many different forms including a unique opcode to indicate an RFENCE, the use of a prefix on an existing instruction, or the use of some other field of an existing instruction. The indication of RFENCE specifies to resolve all control and data speculation (in some embodiments, data speculation only) prior to speculative execution of the next instruction after the RFENCE indication instruction that uses a register operand that is identified by the RFENCE operation instruction. Depending upon the embodiment, the RFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B.

The fetched instruction is decoded at 1003. For example, the fetched RFENCE instruction is decoded by decode circuitry such as that detailed herein.

At 1007, the decoded instruction is executed to resolve all control and data speculation (in some embodiments, data speculation only) prior to speculative execution of the next instruction after the RFENCE that uses the register operand. The execution may be performed by one or more units as detailed above.

In some embodiments, the instruction is committed or retired at 1009.

Exemplary Method of Execution of the CRFENCE Instruction

Figure 11:
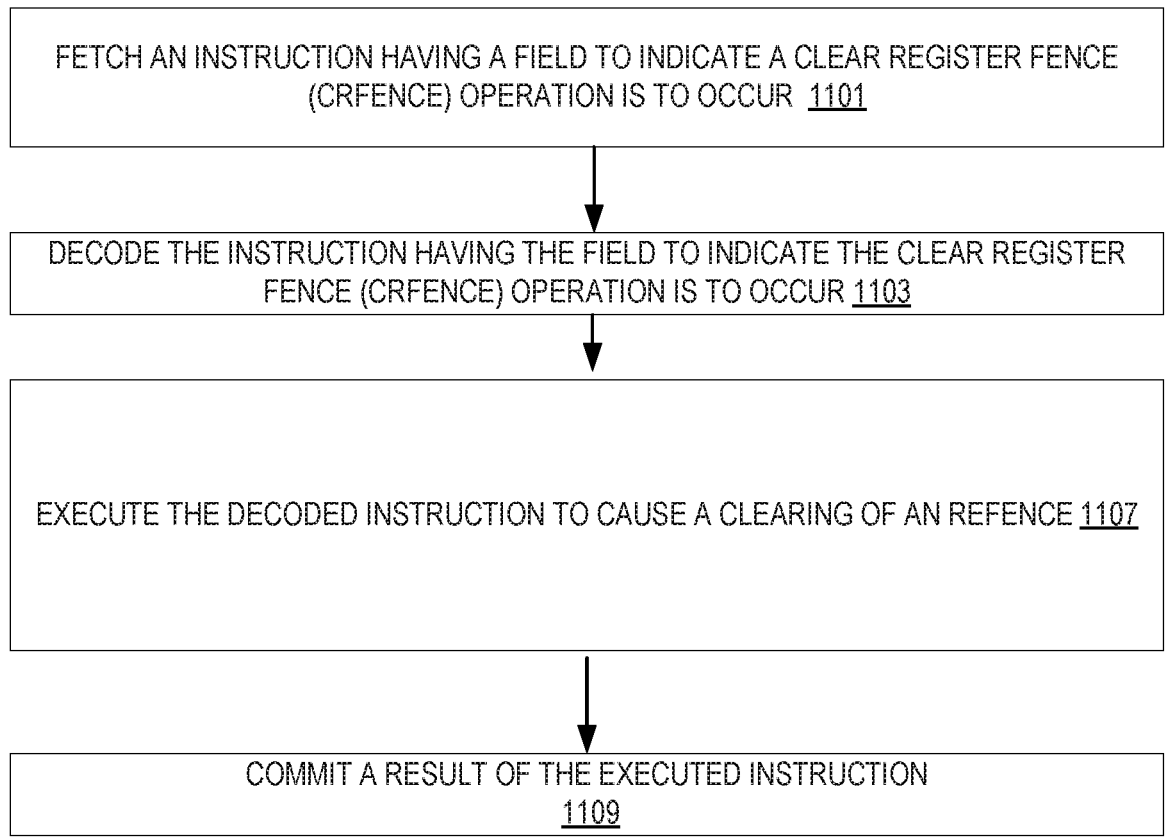
FIG. 11 illustrates an embodiment of method performed by a processor to process a CRFENCE indicating instruction.

FIG. 11 illustrates an embodiment of method performed by a processor to process a CRFENCE indicating instruction.

At 1101, an instruction is fetched. For example, an instruction indicating a CRFENCE operation is fetched. The instruction includes a field for an opcode. As noted above, the instruction may indicate an CRFENCE in many different forms including a unique opcode to indicate an CRFENCE, the use of a prefix on an existing instruction, or the use of some other field of an existing instruction. The indication of CRFENCE specifies to clear the RFENCE. Depending upon the embodiment, the CRFENCE instruction is performed by one or more of a branch prediction unit, instruction fetch unit, decode unit, rename/allocator unit, scheduler unit, memory access unit, retirement unit, or execution unit of a processor such as the units (circuitry) illustrated in FIG. 15B.

The fetched instruction is decoded at 1103. For example, the fetched CRFENCE instruction is decoded by decode circuitry such as that detailed herein.

At 1107, the decoded instruction is executed to clear a RFENCE.

In some embodiments, the instruction is committed or retired at 1109.

Embodiments Applying the Above Semantics to Ordinary Instructions

The above semantics described in the previous sections can also be applied to ordinary, existing instructions through the use of mode bits (or by redefining the ISA to include the above semantics by default). For example, in some embodiments, a new mode bit in a system register adds AFENCE and PFENCE semantics to all system call instructions. In some embodiments, a new mode bit in a system register adds RFENCE semantics to all indirect branch operands. In some embodiments, CMOV* instructions are defined to include VRFENCE semantics on all operands.

Exemplary Hardware to Execute the Described Instructions

Figure 12:
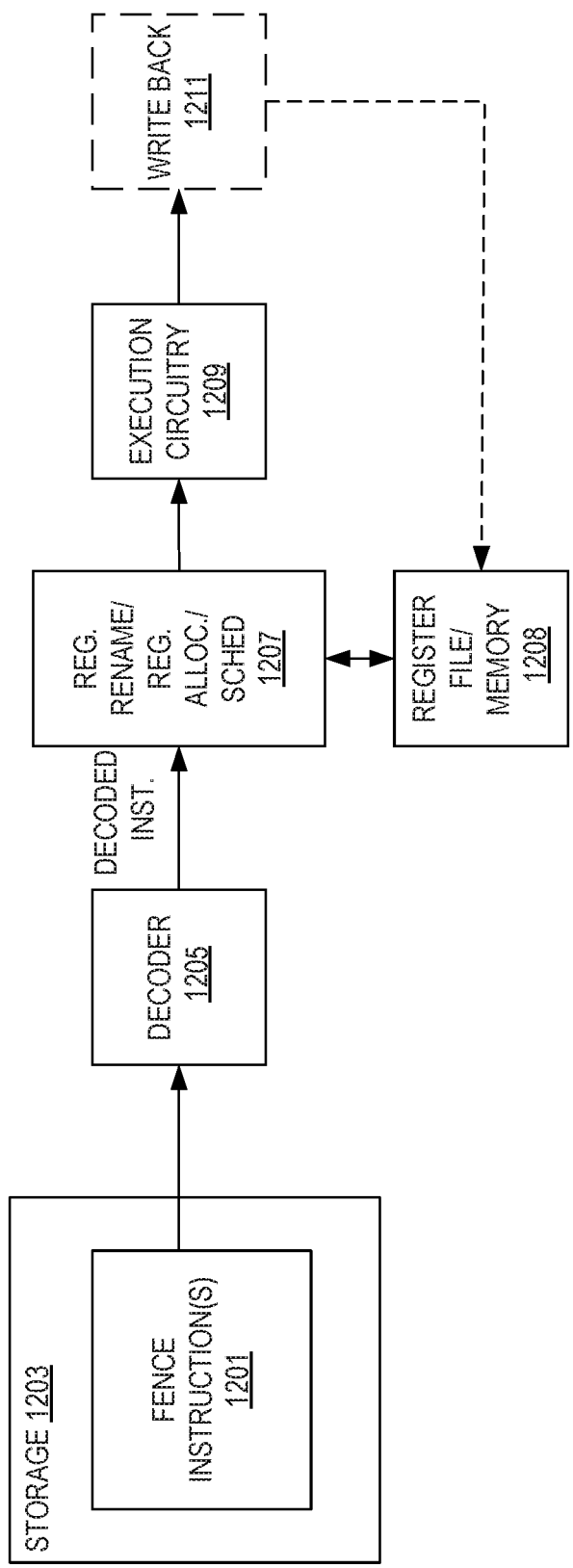
FIG. 12 illustrates an embodiment of hardware to process an instruction such as the instructions detailed herein.

FIG. 12 illustrates an embodiment of hardware to process an instruction such as the instructions detailed herein. As illustrated, storage 1201 (such as a disk, memory, etc.) stores the instruction 1201 to be executed. Note other embodiments of a processor or core are detailed herein.

The instruction is received by decode circuitry 1205. For example, the decode circuitry 1205 receives this instruction from fetch logic/circuitry. The instructions include fields as detailed above. In some embodiments, the sources and destination are registers, and in other embodiments one or more are memory locations. The decode circuitry 1205 decodes the instruction into one or more operations. In some embodiments, this decoding includes generating a plurality of micro-operations to be performed by execution circuitry (such as execution circuitry). The decode circuitry 1205 also decodes instruction prefixes (if used). Note this decoder circuitry 1205 and other decoder circuitry discussed provide functionality to decode the new instructions detailed herein. As such, no known decoder is capable of decoding these instructions.

In some embodiments, register renaming, register allocation, and/or scheduling circuitry 1207 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1208 store data as operands of the instruction to be operated on by execution circuitry. Exemplary register types include packed data registers, general purpose registers, and floating-point registers.

Execution circuitry executes 1209 the decoded instruction as detailed herein. Write back (retirement) circuitry 1211 commits the result of the execution of the decoded instruction. Note the execution circuitry is configurable to execute these new decoded instructions.

Detailed below are exemplary instruction formats, architectures, and systems that may be utilized for the above detailed instructions. For example, an exemplary pipeline supporting the instructions is detailed that includes circuitry to perform the methods detailed herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

FIG. 13A is a block diagram illustrating an exemplary instruction format according to embodiments of the invention. FIG. 13A shows an instruction format 1300 that is specific in the sense that it specifies the location, size, interpretation, and order of the fields, as well as values for some of those fields. The instruction format 1300 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions.

EVEX Prefix (Bytes 0-3) 1302—is encoded in a four-byte form.

Format Field 1382 (EVEX Byte 0, bits [7:0])—the first byte (EVEX Byte 0) is the format field 1382 and it contains 0x62 (the unique value used for distinguishing the vector friendly instruction format in one embodiment of the invention).

The second-fourth bytes (EVEX Bytes 1-3) include a number of bit fields providing specific capability.

REX field 1305 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1315 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements). This field is optional in the sense that it is not needed if only one data element width is supported and/or data element widths are supported using some aspect of the opcodes.

EVEX.vvvv 1320 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1320 encodes the 4 low-order bits of the first source register specifier stored in inverted (is complement) form. Depending on the instruction, an extra different EVEX bit field is used to extend the specifier size to 32 registers.

EVEX.U 1368 Class field (EVEX byte 2, bit [2]—U)—If EVEX.U=0, it indicates class A (support merging-writemasking) or EVEX.U0; if EVEX.U=1, it indicates class B (support zeroing and merging-writemasking) or EVEX.U1.

Prefix encoding field 1325 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1353 (EVEX byte 3, bit [7]—EH; also known as EVEX.EH, EVEX.rs, EVEX.RL, EVEX.writemask control, and EVEX.N; also illustrated with a)—its content distinguishes which one of the different augmentation operation types are to be performed.

Beta field 1355 (EVEX byte 3, bits [6:4]—SSS, also known as EVEX.s$_{2-0}$, EVEX.r$_{2-0}$, EVEX.rr1, EVEX.LL0, EVEX.LLB; also illustrated with βββ)—distinguishes which of the operations of a specified type are to be performed.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Writemask field 1371 (EVEX byte 3, bits [2:0]—kkk)—its content specifies the index of a register in the writemask registers. In one embodiment of the invention, the specific value EVEX.kkk=000 has a special behavior implying no writemask is used for the particular instruction (this may be implemented in a variety of ways including the use of a writemask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the writemask field 1371 allows for partial vector operations, including loads, stores, arithmetic, logical, etc. While embodiments of the invention are described in which the writemask field's 1371 content selects one of a number of writemask registers that contains the writemask to be used (and thus the writemask field's 1371 content indirectly identifies that masking to be performed), alternative embodiments instead or additional allow the mask write field's 1371 content to directly specify the masking to be performed.

Real Opcode Field 1330 (Byte 4) is also known as the opcode byte. Part of the opcode is specified in this field.

MOD R/M Field 1340 (Byte 5) includes MOD field 1342, register index field 1344, and R/M field 1346. The MOD field's 1342 content distinguishes between memory access and non-memory access operations. The role of register index field 1344 can be summarized to two situations: encoding either the destination register operand or a source register operand, or be treated as an opcode extension and not used to encode any instruction operand. The content of register index field 1344, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

The role of R/M field 1346 may include the following: encoding the instruction operand that references a memory address, or encoding either the destination register operand or a source register operand.

Scale, Index, Base (SIB) Byte (Byte 6)—The scale field's 1350 content allows for the scaling of the index field's content for memory address generation (e.g., for address generation that uses $2^{scale}$*index+base). SIB.xxx 1354 and SIB.bbb 1356—the contents of these fields have been previously referred to with regard to the register indexes Xxxx and Bbbb.

Displacement field 1363A (Bytes 7-10)—when MOD field 1342 contains 10, bytes 7-10 are the displacement field 1363A, and it works the same as the legacy 32-bit displacement (disp32) and works at byte granularity. This may be used as part of memory address generation (e.g., for address generation that uses $2^{scale}$*index+base+displacement).

Displacement factor field 1363B (Byte 7)—when MOD field 1342 contains 01, byte 7 is the displacement factor field 1363B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1363B is a reinterpretation of disp8; when using displacement factor field 1363B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1363B substitutes the legacy x86 instruction set 8-bit displacement. Thus, the displacement factor field 1363B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1372 allows for the specification of an immediate. This field is optional in the sense that is it not present in an implementation of the generic vector friendly format that does not support immediate and it is not present in instructions that do not use an immediate.

Full Opcode Field

FIG. 13B is a block diagram illustrating the fields of the instruction format 1300 that make up the full opcode field 1374 according to one embodiment of the invention. Specifically, the full opcode field 1374 includes the format field 1382, the base operation field 1343, and the data element width (W) field 1363. The base operation field 1343 includes the prefix encoding field 1325, the opcode map field 1315, and the real opcode field 1330.

Register Index Field

FIG. 13C is a block diagram illustrating the fields of the format 1300 that make up the register index field 1345 according to one embodiment of the invention. Specifically, the register index field 1345 includes the REX field 1305, the REX' field 1310, the MODR/M.reg field 1344, the MODR/M.r/m field 1346, the VVVV field 1320, xxx field 1354, and the bbb field 1356.

Augmentation Operation Field

Figure 13D:
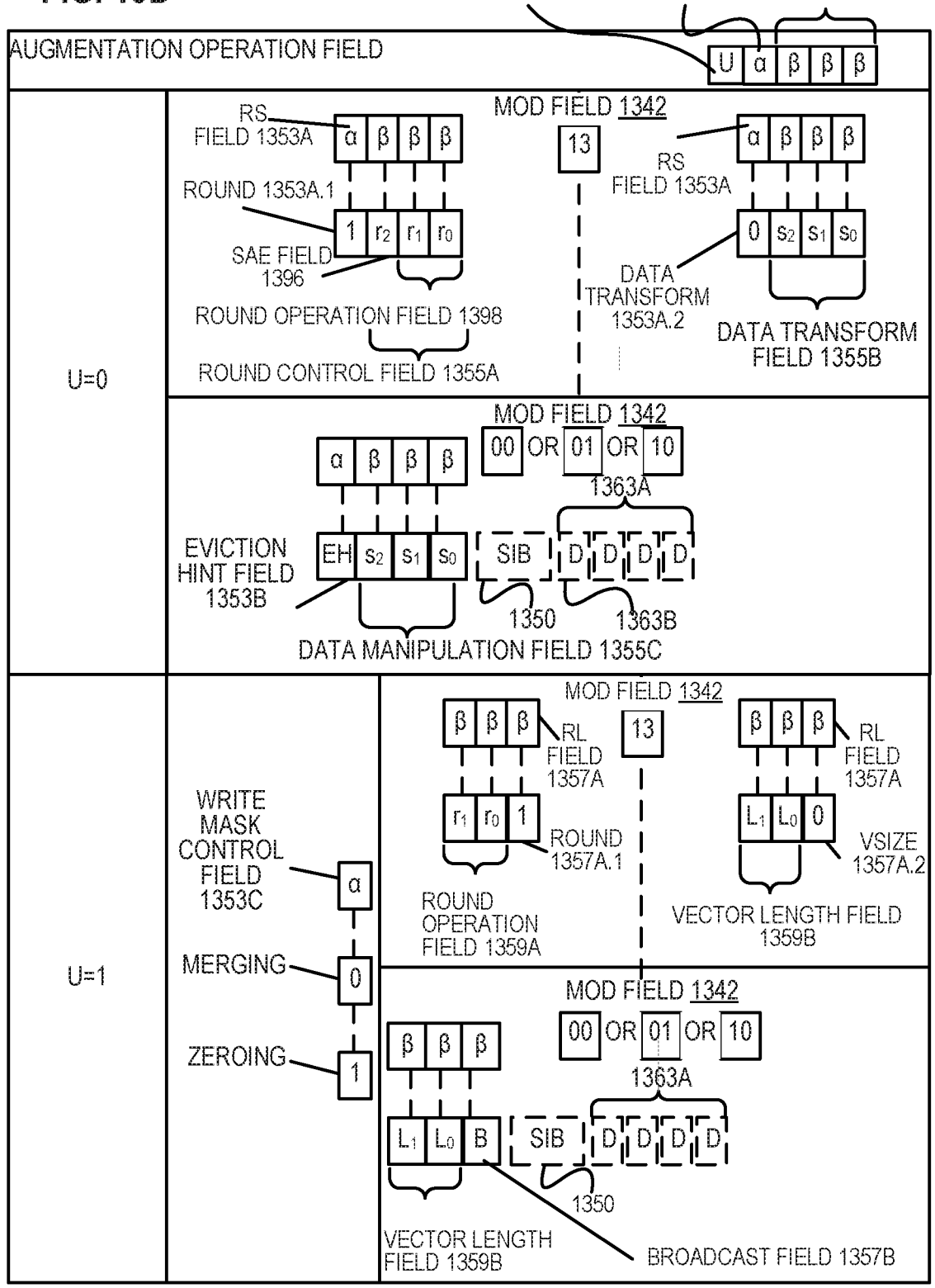
FIG. 13D is a block diagram illustrating the fields of the instruction format that make up the augmentation operation field according to one embodiment of the invention.

FIG. 13D is a block diagram illustrating the fields of the instruction format 1300 that make up an augmentation operation field according to one embodiment of the invention. When the class (U) field 1368 contains 0, it signifies EVEX.U0 (class A 1368A); when it contains 1, it signifies EVEX.U1 (class B 1368B). When U=0 and the MOD field 1342 contains 11 (signifying a no memory access operation), the alpha field 1353 (EVEX byte 3, bit [7]—EH) is interpreted as the rs field 1353A. When the rs field 1353A contains a 1 (round 1353A.1), the beta field 1355 (EVEX byte 3, bits [6:4]—SSS) is interpreted as the round control field 1355A. The round control field 1355A includes a one bit SAE field 1396 and a two bit round operation field 1398. When the rs field 1353A contains a 0 (data transform 1353A.2), the beta field 1355 (EVEX byte 3, bits [6:4]—SSS) is interpreted as a three bit data transform field 1355B. When U=0 and the MOD field 1342 contains 00, 01, or 10 (signifying a memory access operation), the alpha field 1353 (EVEX byte 3, bit [7]—EH) is interpreted as the eviction hint (EH) field 1353B and the beta field 1355 (EVEX byte 3, bits [6:4]—SSS) is interpreted as a three bit data manipulation field 1355C.

When U=1, the alpha field 1353 (EVEX byte 3, bit [7]—EH) is interpreted as the writemask control (Z) field 1353C. When U=1 and the MOD field 1342 contains 11 (signifying a no memory access operation), part of the beta field 1355 (EVEX byte 3, bit [4]—$S_0$) is interpreted as the RL field 1357A; when it contains a 1 (round 1357A.1) the rest of the beta field 1355 (EVEX byte 3, bit [6-5]—$S_{2-1}$) is interpreted as the round operation field 1359A, while when the RL field 1357A contains a 0 (VSIZE 1357.A2) the rest of the beta field 1355 (EVEX byte 3, bit [6-5]—$S_{2-1}$) is interpreted as the vector length field 1359B (EVEX byte 3, bit [6-5]—$L_{1-0}$). When U=1 and the MOD field 1342 contains 00, 01, or 10 (signifying a memory access operation), the beta field 1355 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 14:
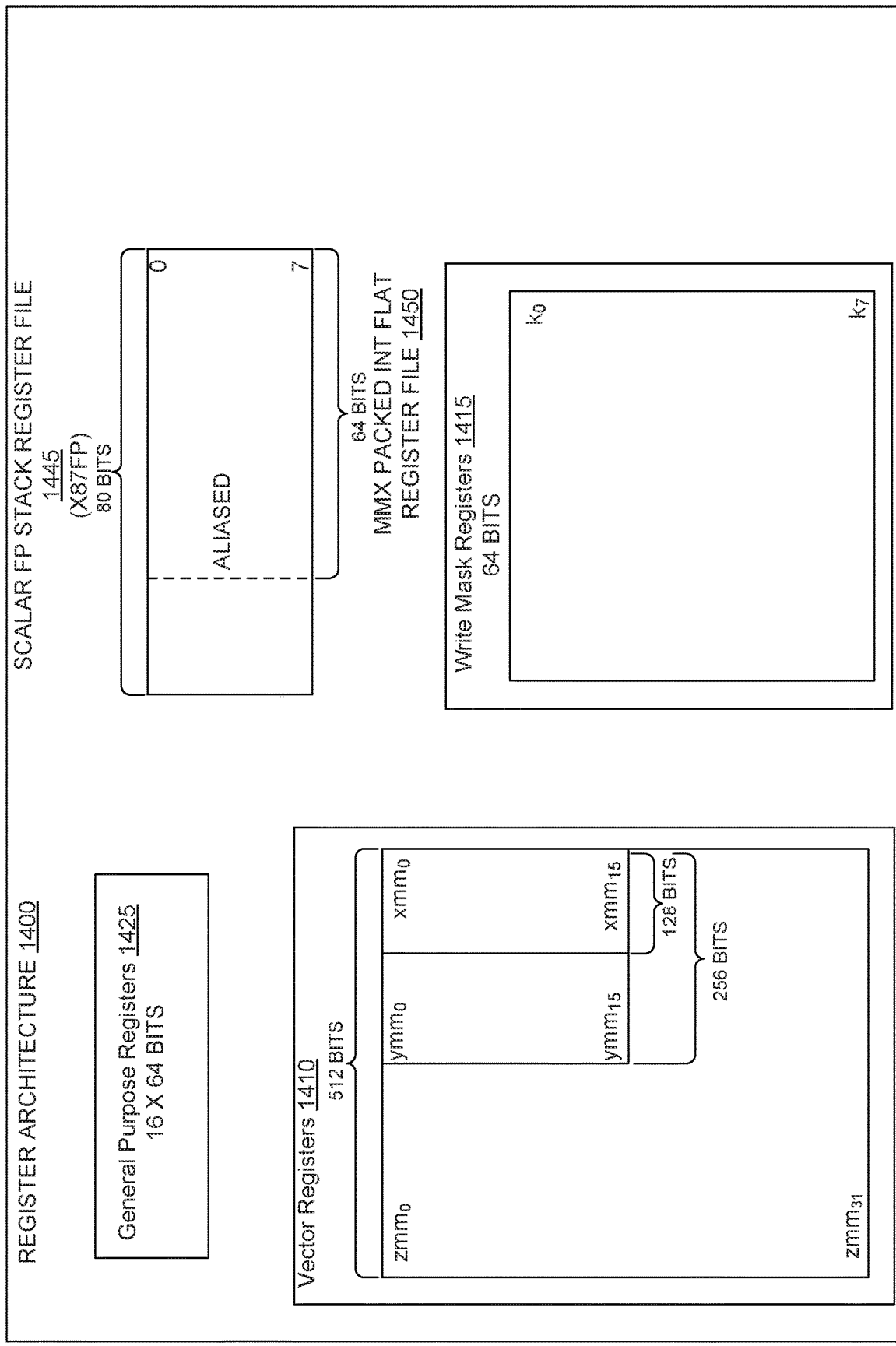
FIG. 14 is a block diagram of a register architecture according to one embodiment of the invention.

FIG. 14 is a block diagram of a register architecture 1400 according to one embodiment of the invention. In the embodiment illustrated, there are 32 vector registers 1410 that are 512 bits wide; these registers are referenced as ZMM0 through ZMM31. The lower order 256 bits of the lower 16 ZMM registers are overlaid on registers YMM0-16. The lower order 128 bits of the lower 16 ZMM registers (the lower order 128 bits of the YMM registers) are overlaid on registers XMM0-15. In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the instruction format 1300 operate on packed or scalar single/double-precision floating point data and packed or scalar integer data. Scalar operations are operations performed on the lowest order data element position in a ZMM/YMM/XMM register; the higher order data element positions are either left the same as they were prior to the instruction or zeroed depending on the embodiment.

Writemask registers 1415—in the embodiment illustrated, there are 8 writemask registers (k0 through k7), each 64 bits in size. In an alternate embodiment, the writemask registers 1415 are 16 bits in size. In some embodiments, the vector mask register k0 cannot be used as a writemask; when the encoding that would normally indicate k0 is used for a writemask, it selects a hardwired writemask of 0xFFFF, effectively disabling writemasking for that instruction.

General-purpose registers 1425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1445, on which is aliased the MMX packed integer flat register file 1450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figure 15A:
FIG. 15A is a block diagram illustrating both an exemplary in-order pipeline and an exemplary register renaming, out-of-order issue/execution pipeline according to embodiments of the invention.
Figure 15B:
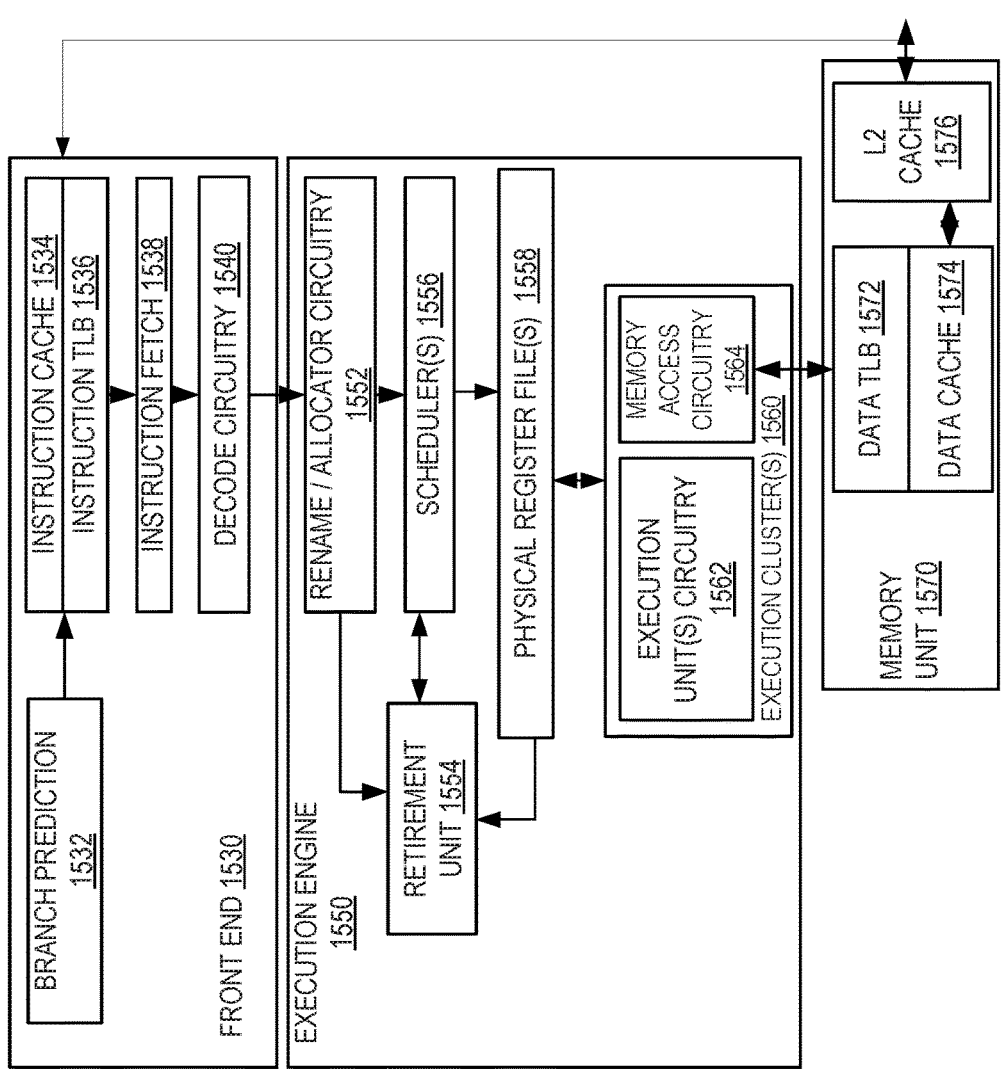
FIG. 15B is a block diagram illustrating both an exemplary embodiment of an in-order architecture core and an exemplary register renaming, out-of-order issue/execution architecture core to be included in a processor according to embodiments of the invention.
Figure 16B:
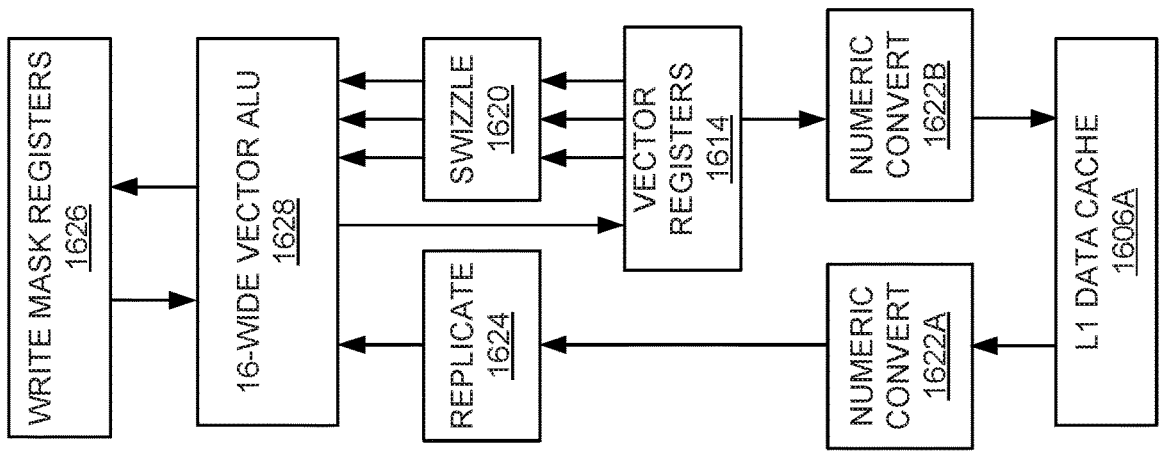
FIGS. 16A-B illustrate a block diagram of a more specific exemplary in-order core architecture, which core would be one of several logic blocks (including other cores of the same type and/or different types) in a chip.
Figure 16A:
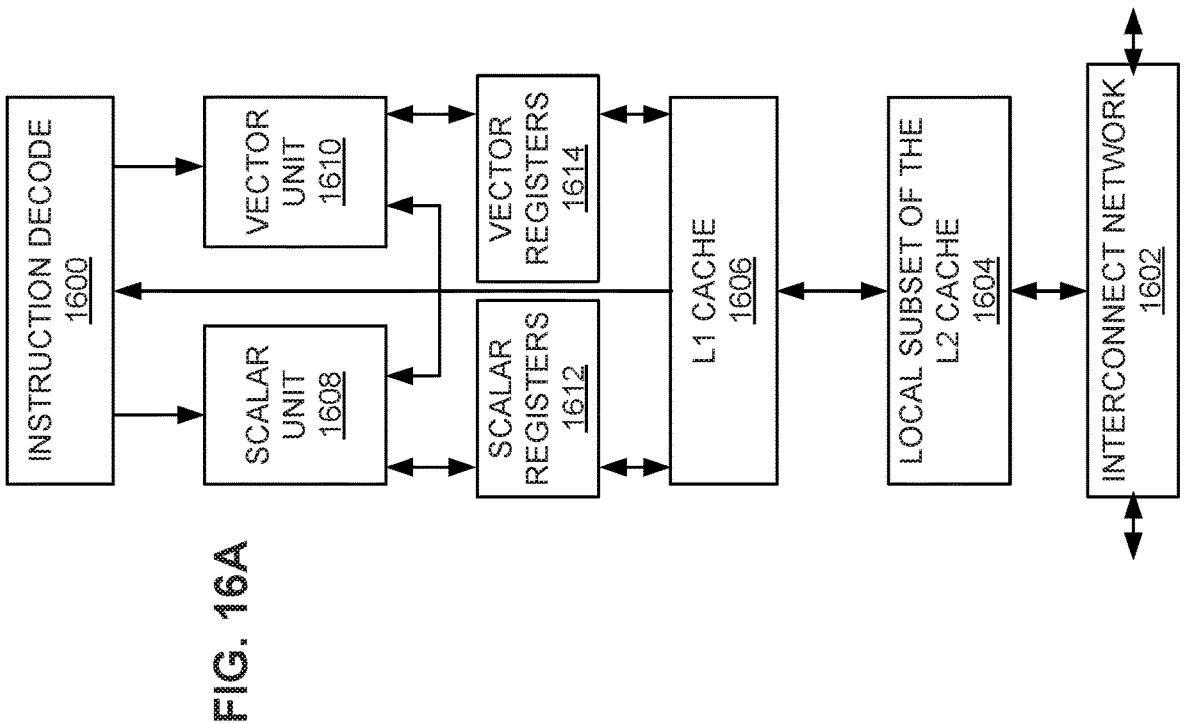
Figure 17:
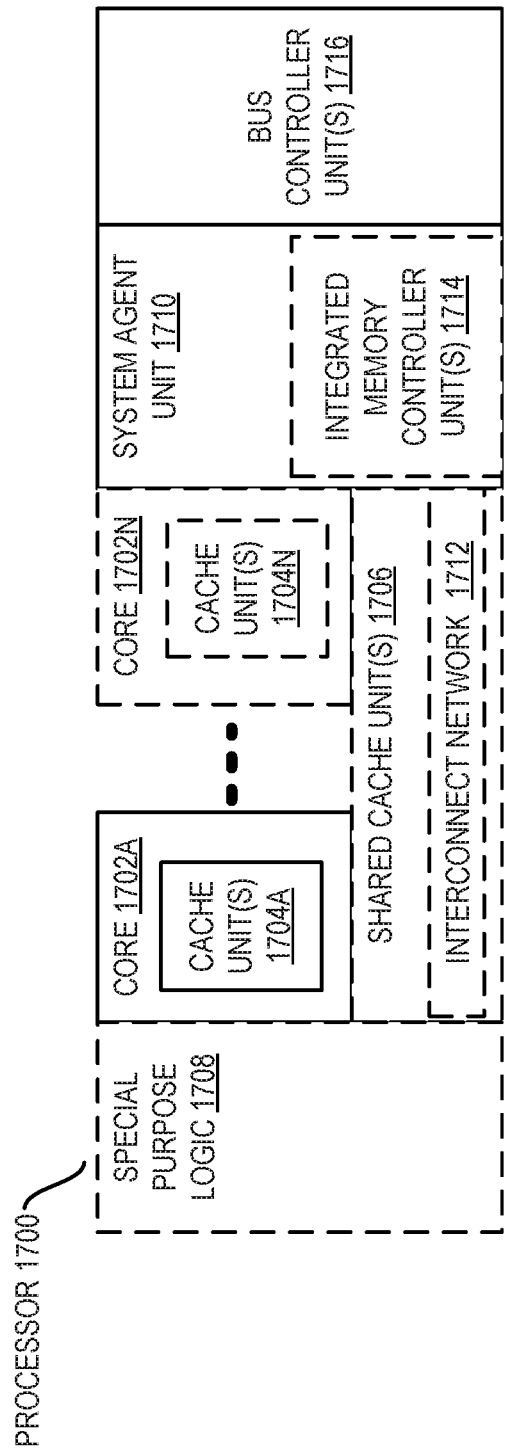
FIG. 17 is a block diagram of a processor that may have more than one core, may have an integrated memory controller, and may have integrated graphics according to embodiments of the invention.
Figure 18:
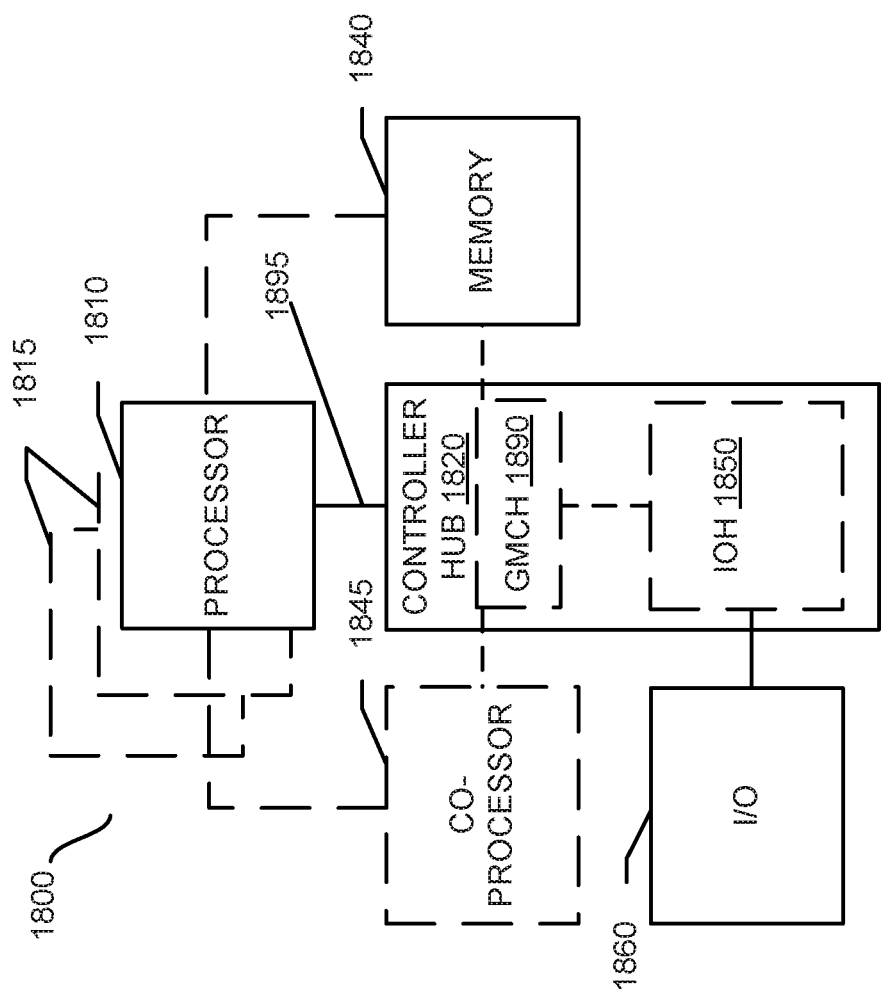
FIG. 18 shown a block diagram of a system in accordance with one embodiment of the present invention.
Figure 19:
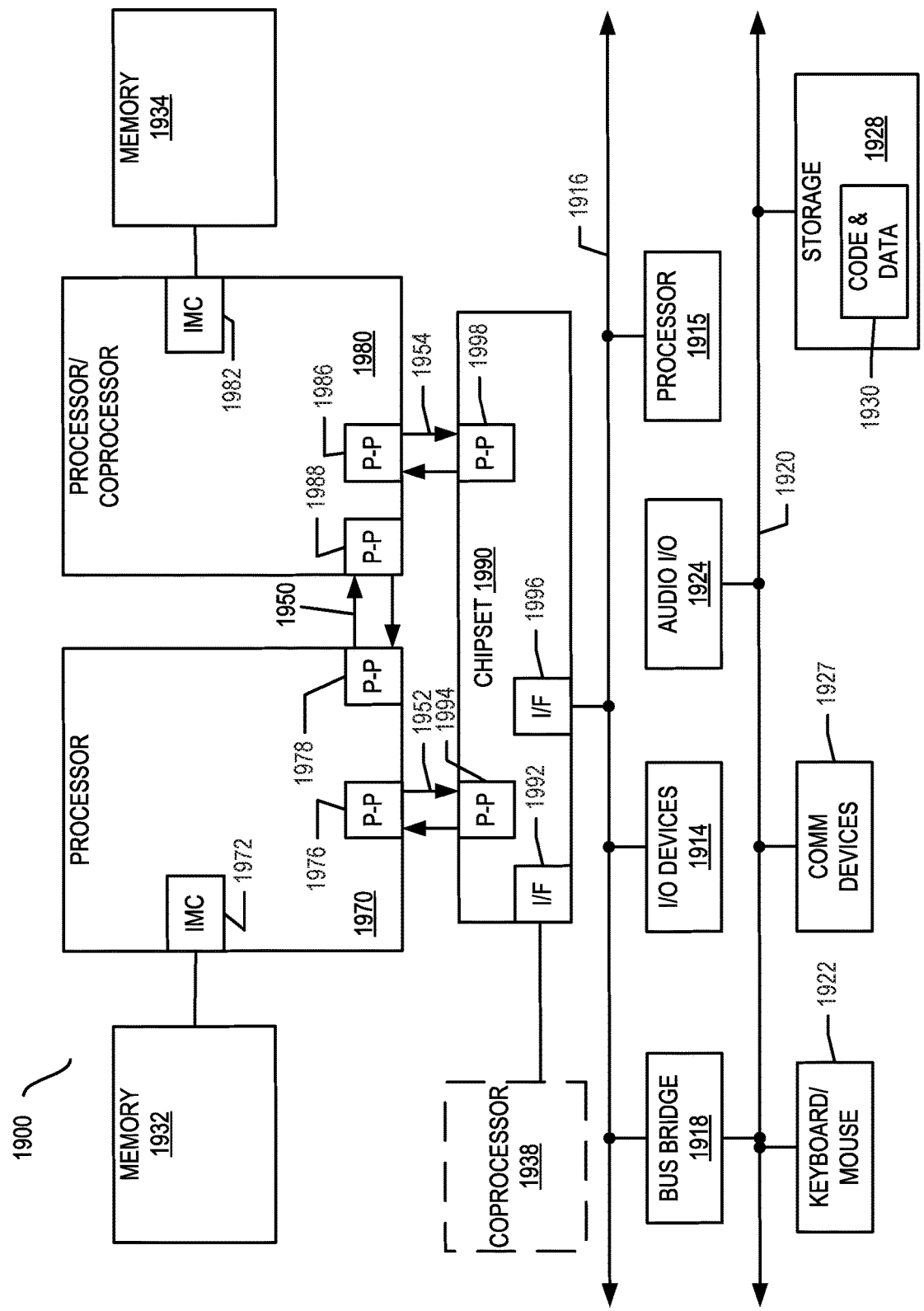
FIG. 19 is a block diagram of a first more specific exemplary system in accordance with an embodiment of the present invention.
Figure 20:
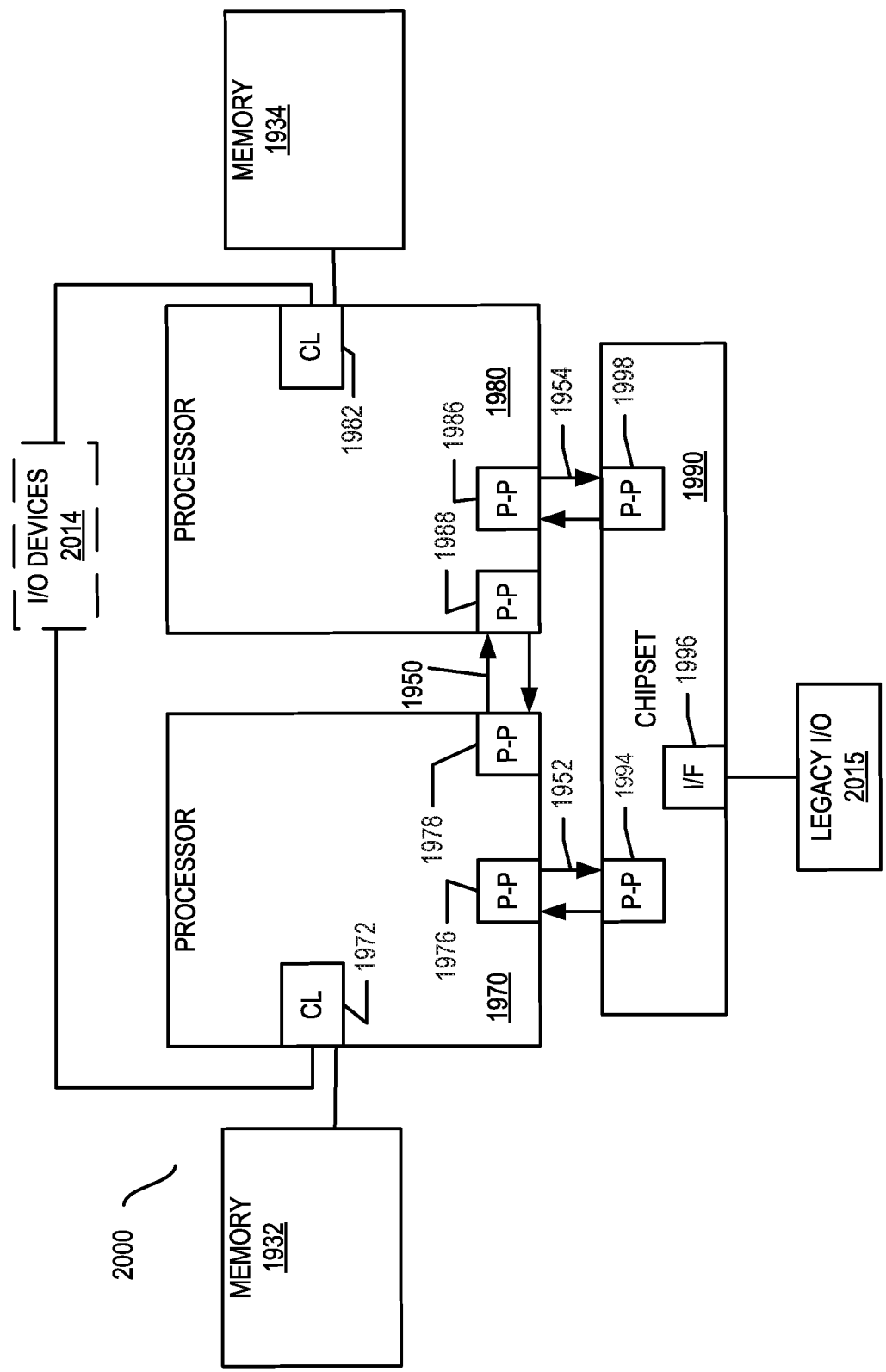
FIG. 20 is a block diagram of a second more specific exemplary system in accordance with an embodiment of the present invention.
Figure 21:
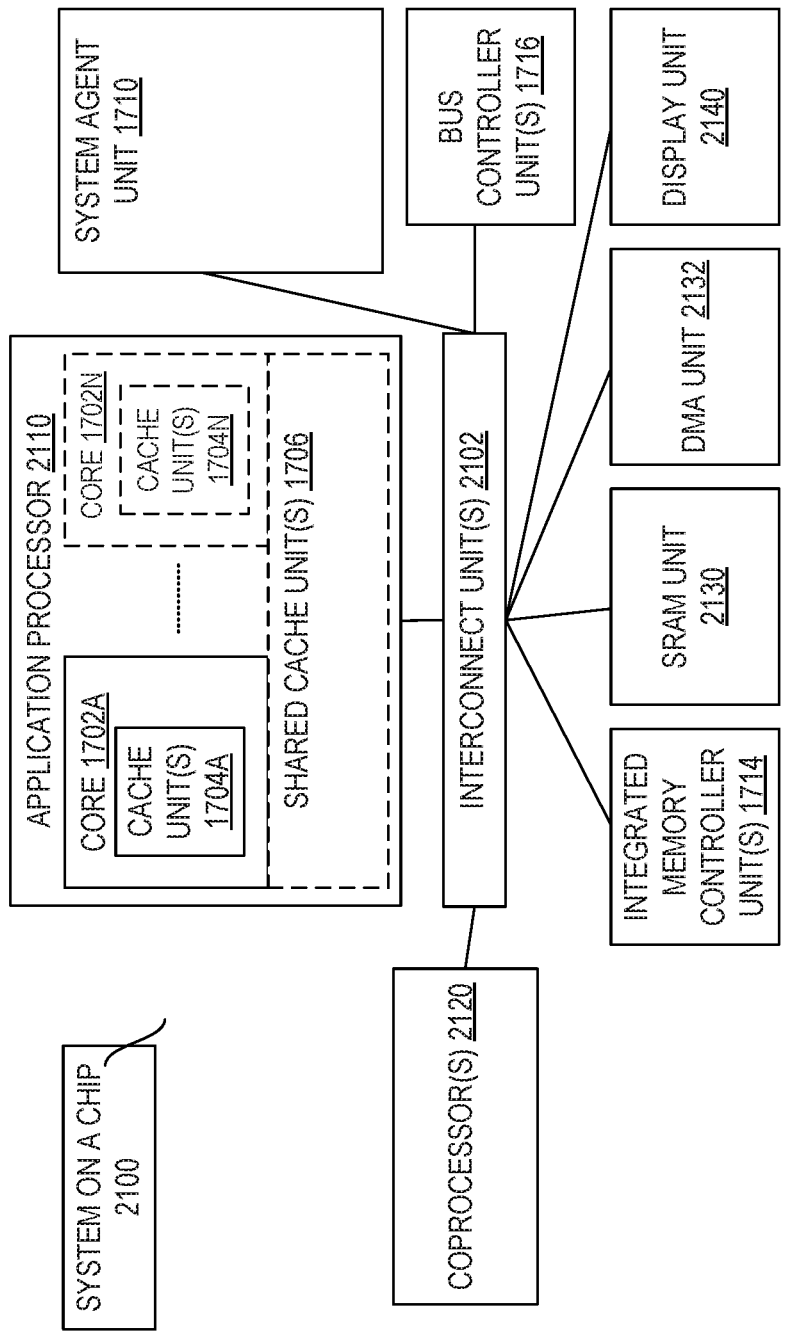
FIG. 21 is a block diagram of a SoC in accordance with an embodiment of the present invention.
Figure 22:
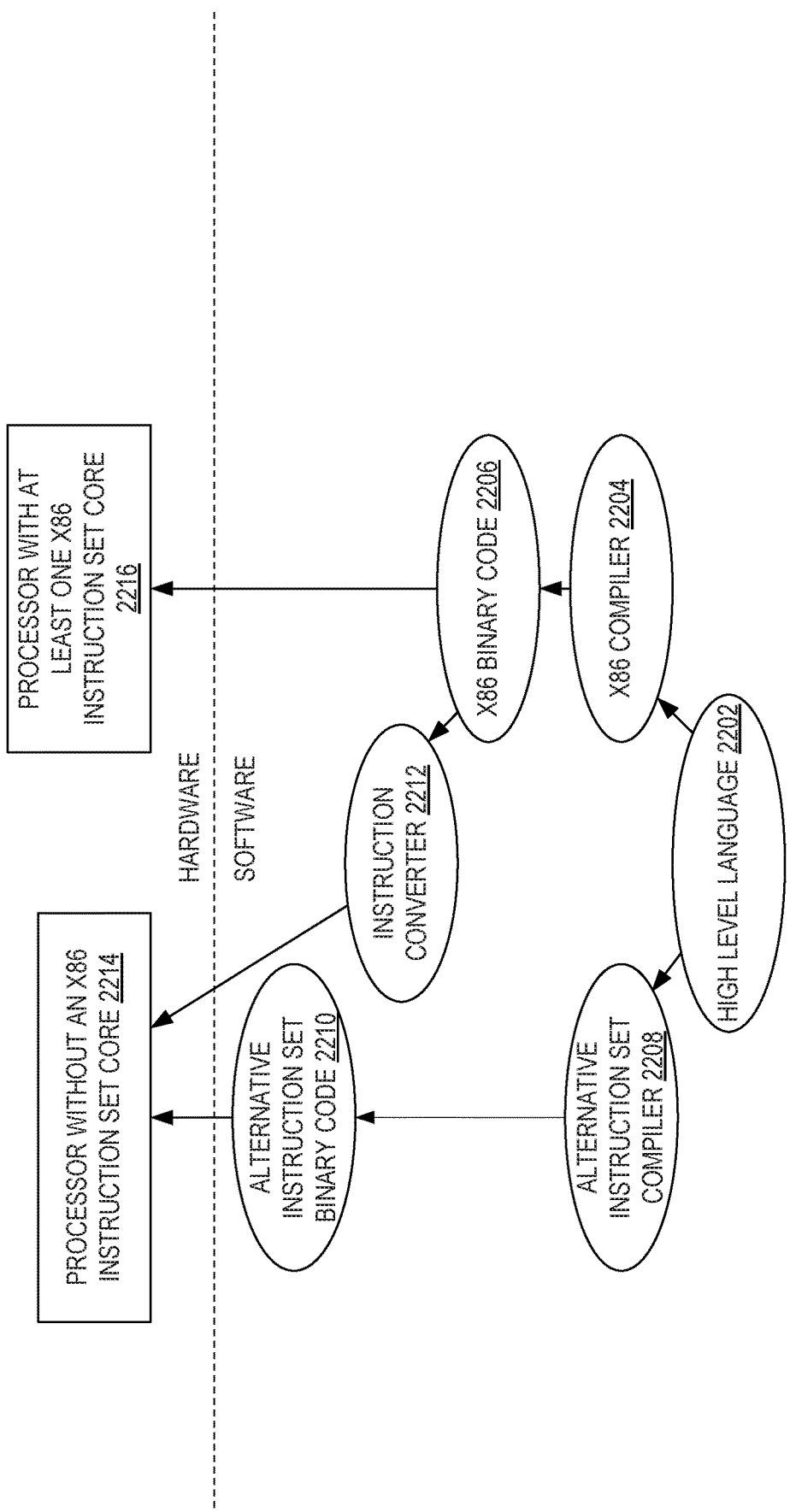
FIG. 22 is a block diagram contrasting the use of a software instruction converter to convert binary instructions in a source instruction set to binary instructions in a target instruction set according to embodiments of the invention.

FIG. 15A is a block diagram illustrating both an exemplary in-order pipeline and an exemplary register renaming, out-of-order issue/execution pipeline according to embodiments of the invention. FIG. 15B is a block diagram illustrating both an exemplary embodiment of an in-order architecture core and an exemplary register renaming, out-of-order issue/execution architecture core to be included in a processor according to embodiments of the invention. The solid lined boxes in FIGS. 15A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like.

The front end unit 1530 includes a branch prediction unit 1532 coupled to an instruction cache unit 1534, which is coupled to an instruction translation lookaside buffer (TLB) 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a writemask registers unit, and a scalar registers unit. These register units may provide architectural vector registers, vector mask registers, and general purpose registers. The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1554 and the physical register file(s) unit(s) 1558 are coupled to the execution cluster(s) 1560. The execution cluster(s) 1560 includes a set of one or more execution units 1562 and a set of one or more memory access units 1564. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory.

By way of example, the exemplary register renaming, out-of-order issue/execution core architecture may implement the pipeline 1500 as follows: 1) the instruction fetch 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1590 includes logic to support a packed data instruction set extension (e.g., AVX1, AVX2), thereby allowing the operations used by many multimedia applications to be performed using packed data.

Additionally, some exemplary embodiments include, but are not limited to:

Example 1

A method comprising:
decoding an instruction that includes an indication that a branching fence operation is to be erected such that instructions subsequent to the instruction are not speculatively executed until branches that precede the instruction have been resolved; and
executing the decoded instruction to halt speculative execution of instructions subsequent to the decoded instruction while all preceding branches are resolved.

Example 2

The method of example 1, wherein the indication is an opcode of the instruction.

Example 3

The method of example 1, wherein the indication is included in a prefix of the instruction.

Example 4

The method of any of examples 1-3, wherein, in response to the instruction, scheduler circuitry is to not schedule speculative instructions until the branches that precede the instruction have been resolved.

Example 5

The method of any of examples 1-4, further comprising setting a marker for each branch to resolve.

Example 6

The method of example 5, wherein the markers are set in entries a branch prediction unit.

Example 7

An apparatus to perform the method of any of examples 1-6.

Example 8

A non-tangible machine-readable storage medium storing an instruction that is to cause a processor to perform a method according to any of examples 1-6.

Example 9

A method comprising:
decoding an instruction that includes an indication that prediction context established by instructions older than the instruction are to be discarded; and
executing the decoded instruction to discard prediction context established by instructions older than the instruction.

Example 10

The method of example 9, wherein the instruction further includes a location of a replacement prediction context and executing the decoded instruction further comprises replacing the discarded context with the replacement prediction context.

Example 11

The method of any of examples 9-10, wherein discarding the prediction context comprises storing the prediction context in a location identified by a field in the instruction.

Example 12

The method of any of examples 9-11, wherein the prediction context of one or more of branch predictors of branch prediction unit, prefetch predictors of fetch unit, and memory dependence predictors of memory access circuitry are discarded.

Example 13

The method of c any of examples 9-12, wherein the indication is an opcode of the instruction.

Example 14

The method of any of examples 9-12, wherein the indication is included in a prefix of the instruction.

Example 15

An apparatus to perform the method of any of examples 9-14.

Example 16

A non-tangible machine-readable storage medium storing an instruction that is to cause a processor to perform a method according to any of examples 9-14.

Example 17

A method comprising
decoding an instruction that includes an indication that all potential exceptions are to be resolved before speculatively executing instructions past the decoded instruction; and
executing the decoded instruction to halt speculatively executing instructions past the decoded instruction until all potential exceptions before the instruction have been resolved.

Example 18

The method of example 17, wherein a potential exception is one or more of fault, a system exception, and a floating-point error.

Example 19

The method of c any of examples 17-18, wherein the indication is an opcode of the instruction.

Example 20

The method of any of examples 17-18, wherein the indication is included in a prefix of the instruction.

Example 21

The method of any of examples 17-20, further comprising: tracking outstanding exceptions to be resolved.

Example 22

The method of any of examples 17-21, wherein scheduler circuitry performs the halt.

Example 23

An apparatus to perform the method of any of examples 17-22.

Example 24

A non-tangible machine-readable storage medium storing an instruction that is to cause a processor to perform a method according to any of examples 17-22.

Example 25

A method comprising:
decoding an instruction that includes an indication to compute all addresses of memory references older than the decoded instruction prior to speculative execution of instructions younger than the decoded instruction; and
executing the decoded instruction to halt speculatively executing instructions younger the decoded instruction until all addresses of memory references older than the decoded instruction are computed.

Example 26

The method of example 25, wherein the indication is an opcode of the instruction.

Example 27

The method of example 25, wherein the indication is included in a prefix of the instruction.

Example 28

The method of any of examples 25-27, wherein scheduler circuitry performs the halt.

Example 29

An apparatus to perform the method of any of examples 25-28.

Example 30

A non-tangible machine-readable storage medium storing an instruction that is to cause a processor to perform a method according to any of examples 25-28.

Example 31

A method comprising:
decoding an instruction that includes an indication to resolve all data speculation prior to speculative execution of the next instruction after the instruction that uses a register operand that is identified by the instruction; and
executing the decoded instruction to halt speculative execution of the next instruction after the instruction that uses the register operand that is identified by the instruction until all data speculation has been resolved.

Example 32

The method of example 31, wherein all control speculation data is to be resolved prior to lifting the halt.

Example 33

The method of example 31, wherein the indication is an opcode of the instruction.

Example 34

The method of example 31, wherein the indication is included in a prefix of the instruction.

Example 35

The method of any of examples 31-34, wherein scheduler circuitry performs the halt.

Example 36

An apparatus to perform the method of any of examples 31-35.

Example 37

A non-tangible machine-readable storage medium storing an instruction that is to cause a processor to perform a method according to any of examples 31-35.

We claim:
1. A method comprising:
decoding an instance of a single instruction that includes an indication that a branching fence operation is to be erected such that instructions subsequent to the instance of the single instruction are not speculatively executed until branches that precede the instance of the single instruction have been resolved, wherein only branches need to be resolved and not non-branch instructions before any instructions subsequent to the instance of the single instruction are to be speculatively executed; and executing the decoded instance of the single instruction to halt speculative execution of any instructions subsequent to the decoded instruction while all preceding branches are resolved.

2. The method of claim 1, wherein the indication is an opcode of the instance of the single instruction.

3. The method of claim 1, wherein the indication is included in a prefix of the instance of the single instruction.

4. The method of claim 1, wherein, in response to the instance of the single instruction, scheduler circuitry is to not schedule speculative instructions until the branches that precede the instance of the single instruction have been resolved.

5. The method of claim 1, further comprising setting a marker for each branch to resolve.

6. The method of claim 5, wherein the markers are set in entries a branch prediction unit.

7. An apparatus comprising:
decoding circuitry to decode an instance of a single instruction that includes an indication that a branching fence operation is to be erected such that instructions subsequent to the instance of the single instruction are not speculatively executed until branches that precede the instance of the single instruction have been resolved, wherein only branches need to be resolved and not non-branch instructions before any instructions subsequent to the instance of the single instruction are speculatively executed; and execution circuitry to execute the decoded instance of the single instruction to halt speculative execution of any instructions subsequent to the decoded instruction while all preceding branches are resolved.

8. The apparatus of claim 7, wherein the indication is an opcode of the instance of the single instruction.

9. The apparatus of claim 7, wherein the indication is included in a prefix of the instance of the single instruction.

10. The apparatus of claim 7, wherein, in response to the instance of the single instruction, scheduler circuitry is to not schedule speculative instructions until the branches that precede the instance of the single instruction have been resolved.

11. The apparatus of claim 7, further comprising setting a marker for each branch to resolve.

12. The apparatus of claim 11, wherein the markers are set in entries a branch prediction unit.

13. A non-tangible machine-readable storage medium storing an instance of a single instruction that is to cause a processor to perform a method comprising:
decoding the instance of the single instruction that includes an indication that a branching fence operation is to be erected such that instructions subsequent to the instance of the single instruction are not speculatively executed until branches that precede the instance of the single instruction have been resolved, wherein only branches need to be resolved and not non-branch instructions before any instructions subsequent to the instance of the single instruction are speculatively executed; and executing the decoded instance of the single instruction to halt speculative execution of any instructions subsequent to the decoded instruction while all preceding branches are resolved.

14. The non-transitory machine-readable storage medium of claim 13, wherein the indication is an opcode of the instance of the single instruction.

15. The non-transitory machine-readable storage medium of claim 13, wherein the indication is included in a prefix of the instance of the single instruction.

16. The non-transitory machine-readable storage medium of claim 13, wherein, in response to the instance of the single instruction, scheduler circuitry is to not schedule speculative instructions until the branches that precede the instance of the single instruction have been resolved.

17. The non-transitory machine-readable storage medium of claim 13, further comprising setting a marker for each branch to resolve.

18. The non-transitory machine-readable storage medium of claim 17, wherein the markers are set in entries a branch prediction unit.

* * * * *